US010042207B2

(12) United States Patent
Miyake et al.

(10) Patent No.: US 10,042,207 B2
(45) Date of Patent: *Aug. 7, 2018

(54) LIQUID CRYSTAL DISPLAY PANEL AND LIQUID CRYSTAL DISPLAY DEVICE

(71) Applicant: Sharp Kabushiki Kaisha, Sakai, Osaka (JP)

(72) Inventors: Isamu Miyake, Sakai (JP); Koichi Miyachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,554

(22) Filed: Aug. 11, 2017

(65) Prior Publication Data

US 2017/0343863 A1    Nov. 30, 2017

Related U.S. Application Data

(63) Continuation of application No. 15/202,603, filed on Jul. 6, 2016, now Pat. No. 9,759,949, which is a continuation of application No. 14/239,625, filed as application No. PCT/JP2012/067937 on Jul. 13, 2012, now Pat. No. 9,417,482.

(30) Foreign Application Priority Data

Aug. 26, 2011    (JP) .................. 2011-185045

(51) Int. Cl.
  *G02F 1/1337*    (2006.01)
  *G02F 1/1339*    (2006.01)
  *G02F 1/1343*    (2006.01)

(52) U.S. Cl.
  CPC ...... *G02F 1/133711* (2013.01); *G02F 1/1337* (2013.01); *G02F 1/13394* (2013.01); *G02F 1/133788* (2013.01); *G02F 1/134363* (2013.01); *G02F 2001/133738* (2013.01); *G02F 2001/134372* (2013.01)

(58) Field of Classification Search
  CPC ........... G02F 1/133788; G02F 1/13394; G02F 1/1337
  USPC ................................. 349/110, 155–157, 123
  See application file for complete search history.

(56) References Cited

U.S. PATENT DOCUMENTS

2004/0263766 A1* 12/2004 Lee .................. G02F 1/133377
                                                                349/156

OTHER PUBLICATIONS

Miyake et al., "Liquid Crystal Display Panel and Liquid Crystal Display Device", U.S. Appl. No. 15/202,603, filed Jul. 6, 2016.

* cited by examiner

*Primary Examiner* — Thanh-Nhan P Nguyen
(74) *Attorney, Agent, or Firm* — Keating & Bennett, LLP

(57) ABSTRACT

The present invention provides a liquid crystal display panel and a liquid crystal display device having excellent display quality, with reduced string-like defects that occur in display pixels. The liquid crystal display panel of the present invention includes multiple spacers between a pair of substrates, wherein the spacers are arranged such that an inter-spacer distance between adjacent spacers in a longitudinal direction is different from an inter-spacer distance between adjacent spacers in a transverse direction, and an angle formed between a line connecting the spacers with a shorter inter-spacer distance and an alignment direction of liquid crystal molecules at a voltage lower than a threshold voltage in the liquid crystal layer is 20° or smaller.

20 Claims, 9 Drawing Sheets

R G B  29

LIQUID CRYSTAL DISPLAY PANEL AND LIQUID CRYSTAL DISPLAY DEVICE

TECHNICAL FIELD

The present invention relates to a liquid crystal display panel and a liquid crystal display device. More specifically, the present invention relates to a liquid crystal display panel and a liquid crystal display device including a polymer layer for improving a property formed on a horizontal photo-alignment film.

BACKGROUND ART

Due to advantageous features such as thin profile, light weight, and low power consumption, liquid crystal display devices are used in a wide range of fields including mobile communication systems, monitors, and large televisions. Various performances are required in these fields, and various display modes have been developed. As the fundamental structure and principle, these liquid crystal display devices include a pair of substrates for interposing a liquid crystal layer therebetween; and control the transmission/shielding of light (on/off of the display) by appropriately applying a voltage to electrodes disposed on the liquid crystal layer side of at least one of the pair of substrates, and by controlling the alignment direction of liquid crystal molecules in the liquid crystal layer, thus achieving liquid crystal displays.

Examples of the display modes of recent liquid crystal display devices include a vertical alignment (VA) mode in which liquid crystal molecules having negative anisotropy of dielectric constant are aligned vertically to the substrate surface; and an in-plane switching (IPS) mode and a fringe field switching (FFS) mode in which liquid crystal molecules having positive or negative anisotropy of dielectric constant are aligned horizontally to the substrate surface, and a horizontal electric field is applied to the liquid crystal layer.

Herein, as a method of obtaining a high-luminance and high-speed response liquid crystal display device, alignment stabilization techniques using a polymer (hereinafter, also referred to as "polymer sustained (PS) treatment") have been suggested (for example, see Patent Literatures 1 to 9). Among these, according to pre-tilt angle imparting techniques using a polymer (hereinafter, also referred to as "polymer sustained alignment (PSA) technique"), polymerizable components such as a polymerizable monomer and a polymerizable oligomer are mixed to obtain a liquid crystal composition, which is then sealed between the substrates; a voltage is applied between the substrates to tilt liquid crystal molecules; and the monomer is polymerized to form a polymer, with the liquid crystal molecules being tilted. This results in liquid crystal molecules that are tilted at a certain pre-tilt angle even after the voltage application is stopped, and thus the liquid crystal molecules can be aligned in a certain direction. Materials that are polymerizable by heat, light (ultraviolet light), and the like are selected as monomers to form a polymer.

According to another disclosed document, for example, one substrate was subjected to photo-alignment treatment and PS treatment and the other substrate was subjected to rubbing treatment, in a liquid crystal display device; and the influence of hysteresis and the like on the monomer concentration for PS treatment in liquid crystal were investigated (for example, see Non-Patent Literature 1).

CITATION LIST

Patent Literatures

Patent Literature 1: Japanese Patent No. 4175826
Patent Literature 2: Japanese Patent No. 4237977
Patent Literature 3: JP-A 2005-181582
Patent Literature 4: JP-A 2004-286984
Patent Literature 5: JP-A 2009-102639
Patent Literature 6: JP-A 2009-132718
Patent Literature 7: JP-A 2010-33093
Patent Literature 8: U.S. Pat. No. 6,177,972
Patent Literature 9: JP-A 2003-177418

Non-Patent Literature

Non-Patent Literature 1: Y. Nagatake et al. "Hysteresis Reduction in EO Characteristic of Photo-Aligned IPS-LCDs with Polymer-Surface-Stabilized Method", IDW '10, International Display Workshops, 2010, pp. 89-92

SUMMARY OF INVENTION

Technical Problem

The present inventors have been studying photo-alignment technique that allows the liquid crystal alignment direction to be controlled in multiple directions when a voltage is applied, without the need of rubbing treatment on an alignment film, and that provides excellent viewing angle characteristic. The photo-alignment technique is a technique of irradiating an alignment film, which is formed from a light-active material, with light such as ultraviolet light, and thereby causing the alignment film to have an alignment regulating force. According to the photo-alignment technique, since alignment treatment can be performed on a film surface in a non-contact manner, the occurrence of contaminants, dust and the like during alignment treatment can be suppressed. Additionally, unlike rubbing treatment, the photo-alignment technique can be suitably applied even to large panels, and can achieve excellent manufacturing yield.

The current photo-alignment technique has been adopted mainly for the mass production of televisions in which a vertical alignment film is used (for example, VA mode). The current photo-alignment technique has not been adopted for the mass production of televisions in which a horizontal alignment film is used (for example, IPS mode). This is because the use of a horizontal alignment film causes image sticking in a conspicuous manner. The image sticking is a phenomenon in which when the same amount of voltage is continuously applied for a certain period of time to a liquid crystal cell, brightness appears different between a portion where the voltage is continuously applied and a portion where the voltage is not applied.

The present inventors have found that forming a polymer layer stabilized by PS treatment is suitable to reduce the occurrence of image sticking caused by weak anchoring of the photo-alignment film. Therefore, it is important to promote polymerization to allow PS treatment. In addition, as described in Japanese Patent Application No. 2011-084755, a combination of a specific liquid crystal component with PS treatment process is suitable. This increases a polymer layer formation rate (i.e., the rate at which a polymer layer is formed, as a polymerizable monomer in the liquid crystal layer initiates chain polymerization such as radical polymerization, and the polymerized product is deposited on the surface on the liquid crystal layer side of the alignment film), and allows the formation of a polymer layer having a stable alignment regulating force (i.e., a PS layer). Further, the effect of reducing image sticking is particularly excellent when the alignment film is a horizontal alignment film because it increases the polymerization rate and the polymer layer formation rate.

Herein, for example, when PS treatment is performed in order to prevent image sticking in a horizontal electric field alignment mode such as an IPS mode or an FFS mode in which a horizontal photo-alignment film is used, alignment defects in the panel, if occurred, will be immobilized, leading to display defects. Among alignment defects, the occurrence of a string-like defect is particularly problematic. The string-like defect refers to a phenomenon that causes light leakage due to a string-like alignment defect in liquid crystal. The impacts of the light leakage on the quality of the liquid crystal display device are as follows: black appears grayish black; the contrast is poor; and the display becomes rough. None of the above-mentioned Patent Literatures 1 to 8 describes the horizontal photo-alignment film and the occurrence of a string-like defect caused by weak anchoring.

The importance of an object to reduce string-like defects is particularly significant when aiming to mass-produce liquid crystal display devices including a horizontal photo-alignment film having a weak alignment regulating force. It is considered to be a novel object in the technical field of the present invention.

For example, Patent Literature 9 mentioned above provides a liquid crystal display device having improved light transmittance, without decreasing the response speed when a change occurs in the gray scale. According to Embodiment 6-2 of Patent Literature 9, alignment defects occur due to the unevenness of the uneven reflective electrodes, and rubbing treatment fails to provide sufficient alignment treatment on the bottom of the uneven surface. In this respect, the occurrence of disclinations due to alignment disturbance can be suppressed by forming a polymer layer on the uneven reflective electrodes. However, this does not solve the problem of disclinations resulting from immobilization of alignment defects during PS treatment in the liquid crystal display device including a horizontal photo-alignment film having a weak alignment regulating force. Unfortunately, disclinations that occur before PS treatment are strongly immobilized as the disclinations by PS treatment. The technique disclosed in Non-Patent Literature 1 has a room for further improvement to suitably reduce disclinations that occur in display pixels due to PS treatment in the liquid crystal display device including a horizontal photo-alignment film.

The present invention is achieved in view of the current situation described above. It is an object of the present invention to provide a liquid crystal display panel and a liquid crystal display device having excellent display quality, with reduced string-like defects that occur in display pixels.

Solution to Problem

The present inventors conducted extensive studies and found that the above type of string-like defects occurs due to the following three factors. The first factor is weak anchoring of the alignment film itself. The present inventors found that weak anchoring of the alignment film results in a weak alignment regulating force, causing liquid crystal molecules in the bulk to easily stray from the direction in which the alignment film is treated. In other words, a method of increasing the anchoring strength of the alignment film itself is considered as a possible solution to the problem; however, usually, the anchoring energy of a horizontal photo-alignment film is remarkably small, compared to a horizontal alignment film to be rubbed. Thus, the approach to the problem by improving the properties of a material of the horizontal photo-alignment film has been difficult to apply. The second factor is a small elastic constant of liquid crystal. The present inventors found that when the elastic constant is small, liquid crystal molecules tend to undergo elastic deformation, and alignment disturbance is thus likely to occur. The string-like defect is considered to be an alignment defect resulting from splay deformation and/or bend deformation; thus, liquid crystal having a large elastic constant for splay deformation and bend deformation is considered to be less likely to produce alignment defects. The third factor is the presence of spacers. The present inventors found that a spacer is present at both ends of each string-like defect. For example, even when string-like defects occurred at the moment of phase transition from the isotropic phase to the liquid crystal phase, the string-like defects in the area where no spacer is present were observed to be unstable and disappear in a finite time. In other words, the spacers are considered to have an effect of stabilizing string-like defects, and the present inventors examined a method for decreasing the occurrence of such string-like defects in display pixels.

Then, the present inventors found a suggestion for improvement: it is to align liquid crystal molecules in a specific direction in accordance with the arrangement of spacers such as photospacers. In other words, it is to provide a liquid crystal display panel including multiple spacers between a pair of substrates, wherein in a plan view of the main surface of the pair of substrates, the spacers are arranged such that an inter-spacer distance between adjacent spacers in a longitudinal direction is different from an inter-spacer distance between adjacent spacers in a transverse direction, and an angle formed between a line connecting the spacers with a shorter inter-spacer distance than the other inter-spacer distance and an alignment direction of the liquid crystal molecules at a voltage lower than a threshold voltage in the liquid crystal layer is 20° or smaller. This configuration sufficiently reduces string-like defects in display pixels, as described later. The present inventors found that the above problem can be successfully solved in this manner, and thus accomplished the present invention. As another suggestion for improvement, the applicant of the present invention has suggested increasing an elastic constant K1 (splay) and/or an elastic constant K3 (bend) of liquid crystal in an earlier application (Japanese Patent Application No. 2011-051532).

That is, one aspect of the present invention relates to a liquid crystal display panel including: a pair of substrates, and a liquid crystal layer interposed between the pair of substrates, wherein at least one of the pair of substrates includes a photo-alignment film and an electrode in the stated order from the liquid crystal layer side; the photo-alignment film aligns liquid crystal molecules horizontally to a main surface of the at least one of the pair of substrates; the liquid crystal display panel includes multiple spacers between the pair of substrates, the spacers being arranged such that an inter-spacer distance between adjacent spacers in a longitudinal direction is different from an inter-spacer distance between adjacent spacers in a transverse direction in a plan view of the main surface of the pair of substrates; and an angle formed between a line connecting the spacers with a shorter inter-spacer distance than the other inter-spacer distance and an alignment direction of the liquid crystal molecules at a voltage lower than a threshold voltage in the liquid crystal layer is 20° or smaller.

The photo-alignment film aligns the liquid crystal molecules horizontally to the main surface of the at least one of the pair of substrates (the photo-alignment film as used herein is also referred to as "horizontal photo-alignment film"). The horizontal photo-alignment film is not limited as long as it aligns at least liquid crystal molecules adjacent thereto, substantially horizontally to the surface of the horizontal photo-alignment film. It is possible to form a more stable PS layer in this manner because the transfer of the excitation energy from the alignment film to the monomer when a photoactive material is irradiated with light is more efficiently performed in a horizontal alignment film than in a vertical alignment film.

The at least one of the pair of substrates preferably further includes a polymer layer on the liquid crystal layer side of the horizontal photo-alignment film.

Hereinafter, features of the liquid crystal display panel of the present invention and preferred features thereof are described in detail.

Herein, although the longitudinal direction is not particularly limited, it usually refers to a direction along a source bus line, and it includes a substantially longitudinal direction as long as the effects of the present invention are achieved. The transverse direction usually refers to a direction along a gate bus line. It includes a substantially transverse direction as long as the effects of the present invention are achieved.

The liquid crystal display panel of the present invention includes multiple spacers between the pair of substrates, the spacers being arranged such that the inter-spacer distance between adjacent spacers in the longitudinal direction is different from the inter-spacer distance between adjacent spacers in the transverse direction in a plan view of the main surface of the pair of substrates. For example, the liquid crystal display panel may be configured as follows: in a plan view of the main surface of the pair of substrates, when a total of three spacers are selected including a spacer as a reference, a spacer that is adjacent to the reference spacer in the longitudinal direction, and a spacer that is adjacent to the reference spacer in the transverse direction, the inter-spacer distance between adjacent spacers in the longitudinal direction is different from that in the transverse direction; and an angle formed between a line connecting the spacers with a shorter inter-spacer distance and the alignment direction of the liquid crystal molecules at a voltage lower than a threshold voltage in the liquid crystal layer is 20° or smaller.

A preferred embodiment of the liquid crystal display panel of the present invention is as follows: in a plan view of the main surface of the pair of substrates, the spacers are regularly aligned at regular intervals in the longitudinal and transverse directions such that the inter-spacer distance between adjacent spacers in the longitudinal direction of the unit cell is different from that in the transverse direction of the unit cell. The phrase "the spacers are regularly aligned at regular intervals in the longitudinal and transverse directions such that the inter-spacer distance between adjacent spacers in the longitudinal direction of the unit cell is different from that in the transverse direction" means that, for example, the spacers are regularly aligned at regular intervals $d_l$ in the longitudinal direction and at regular intervals $d_w$ in the transverse direction, and the values of $d_l$ and $d_w$ are different from each other. In other words, the spacers are located at the intersections of the grid in which the vertical length of the unit cell is different from the horizontal length thereof. The phrase "regularly aligned" may refer to an alignment in which some of the spacers are not regularly aligned: it suffices if the spacers are substantially regularly aligned. In other words, the spacers do not have to be located at every intersection of the grid. It suffices if the spacers are located substantially at the intersections of the grid, as long as the effects of the present invention are achieved.

The spacers in the liquid crystal display panel of the present invention are preferably regularly aligned at regular intervals in the longitudinal and transverse directions, i.e., the spacers are preferably regularly located at the intersections of the grid in which the vertical length of the unit cell is different from the horizontal length thereof. However, the spacers in the liquid crystal display panel do not have to be regularly aligned at regular intervals in either longitudinal or transverse direction. In this case, the direction of a line connecting the spacers with a shorter inter-spacer distance may differ, depending on how spacers adjacent to a reference spacer in the longitudinal and transverse directions are selected after such a reference spacer is selected. In this case, a line connecting the spacers with the shortest inter-spacer distance among the inter-spacer distances between adjacent spacers in the longitudinal and transverse directions may be regarded as "a line connecting the spacers with a shorter inter-spacer distance".

In the liquid crystal display panel of the present invention, when the inter-spacer distance between neighboring spacers in the longitudinal direction is compared with the inter-spacer distance between neighboring spacers in the transverse direction, a shorter inter-spacer distance is, for example, preferably ⅘ or less of a longer inter-spacer distance. A shorter inter-spacer distance is also preferably ⅕ or more of a longer inter-spacer distance. In a plan view of the main surface of the pair of substrates, each spacer is preferably regularly located at each intersection of the grid, for example, near the top of each pixel. In addition, the spacers are preferably arranged so as to be superimposed with the black matrix, in a plan view of the main surface of the pair of substrates. For example, preferably, the black matrix is arranged in a grid pattern, and the spacers are arranged so as to be superimposed with the intersections of the grid-like black matrix. The sections partitioned by the grid-like black matrix may be, for example, pixels.

The liquid crystal display panel of the present invention is configured such that an angle formed between a line connecting the spacers with a shorter inter-spacer distance than the other inter-spacer distance and the alignment direction of the liquid crystal molecules at a voltage lower than a threshold voltage in the liquid crystal layer is 20° or smaller.

The "alignment direction of the liquid crystal molecules" refers to a direction of the long axis of the liquid crystal molecules. In other words, it refers to the director. The phrase that "an angle formed between a line connecting the spacers and the alignment direction of the liquid crystal molecules is 20° or smaller" may mean that an angle formed between a line connecting the spacers with a shorter inter-spacer distance and the alignment direction of the liquid crystal molecules near the line is 20° or smaller in a plan view of the main surface of the pair of substrates. It may also mean that an angle formed between a line connecting the spacers with a shorter inter-spacer distance and the average alignment direction of the liquid crystal molecules in the entire liquid crystal layer is 20° or smaller in a plan view of the main surface of the pair of substrates. The liquid crystal is aligned in a uniform direction in the most area at a voltage lower than a threshold voltage.

The "threshold" refers to a voltage that generates an electric field in which the liquid crystal layer undergoes optical changes, and the display state thus changes in the liquid crystal display device. The "threshold voltage" refers to, for example, a voltage at which the transmittance is 5% when the transmittance in the bright state is set to 100%. An electric potential difference can be created at a level higher than or equal to the threshold voltage. It means that the liquid crystal display device can be operated in such a manner that creates an electric potential difference at a level higher than or equal to the threshold voltage. Thereby, an electric field that is applied to the liquid crystal layer can be suitably controlled.

If the number of spacers in the entire area of the liquid crystal display panel is assumed to be 100%, 50% or more of the spacers are preferably configured such that the liquid crystal molecules are aligned substantially parallel to a line connecting the adjacent spacers with a short inter-spacer distance. More preferably, substantially all of the spacers in the entire area of the liquid crystal display panel are configured as described above.

In addition, the spacers with a shorter inter-spacer distance preferably refer to the nearest adjacent spacers in the liquid crystal display panel in a plan view of the main surface of the pair of substrates. The "nearest adjacent spacers" refers to the spacers with the shortest inter-spacer distance among the inter-spacer distances between adjacent spacers in the longitudinal and transverse directions in the liquid crystal display panel in which the spacers are regularly arranged. The liquid crystal display panel of the present invention may be configured as described above such that an angle formed between a line connecting the nearest adjacent spacers with the shortest inter-spacer distance among the inter-spacer distances and the alignment direction of the liquid crystal molecules at a voltage lower than a threshold voltage in the liquid crystal layer is 20° or smaller. Such a configuration is another preferred embodiment of the present invention.

The line connecting the spacers with a shorter inter-spacer distance is preferably parallel to the alignment direction of the liquid crystal molecules at a voltage lower than a threshold voltage in the liquid crystal layer. The "parallel" direction includes a direction that is considered to be parallel in the technical field of the present invention, and it also includes a substantially parallel direction. The effects of the present invention can be remarkably excellent in the manner described above.

The spacers may be disposed by being dispersed or the like. Preferably, the spacers are photospacers disposed on the at least one of the pair of substrates and projecting toward the liquid crystal layer. The spacers disposed on the substrate(s) in advance are usually formed of resin. The spacers disposed by being dispersed or the like are usually formed of glass or plastic. The above spacers are preferably those formed of resin, disposed on the substrate(s). More preferably, the resin is acrylic resin. Examples of the shape of each spacer include cylinder, prism, truncated cone, and sphere. Cylinder, prism, and truncated cone are preferred. The spacer may be coated with the horizontal photo-alignment film. The spacer is regarded as being coated with the horizontal photo-alignment film, as long as at least a portion of the spacer in contact with the liquid crystal layer (usually, a lateral side) is coated with the horizontal photo-alignment film. The substrate on which the spacers are disposed is preferably a counter substrate (color filter substrate).

Each of the photospacers preferably has a diameter of 14 µm or less as measured on the base (the surface in contact with the at least one of the pair of substrates) in order to more sufficiently achieve the effects of the present invention. The diameter is more preferably 12 µm or less. The diameter of the base is described later.

The liquid crystal molecules in the liquid crystal layer of the present invention may include a mixture of plural kinds of liquid crystal molecules. The liquid crystal layer may be a mixture of plural kinds of liquid crystal molecules for at least one of the following purposes: ensuring reliability; improving the response speed; and adjusting the liquid crystal phase temperature range, other elastic constants, anisotropy of dielectric constant, and refractive index anisotropy. In the case where the liquid crystal molecules in the liquid crystal layer include a mixture of plural kinds of liquid crystal molecules, the liquid crystal molecules as a whole must be designed to have an elastic coefficient of the present invention. In addition, the liquid crystal molecules in the liquid crystal layer may have either positive anisotropy of dielectric constant (positive type) or negative anisotropy of dielectric constant (negative type).

At least one of the pair of substrates included in the liquid crystal display panel of the present invention includes, for example, a polymer layer, a horizontal photo-alignment film, and an electrode in the stated order from the liquid crystal layer side. A different layer may be present between the polymer layer and the horizontal photo-alignment film and/or between the horizontal photo-alignment film and the electrode. As long as the effects of the present invention are achieved, another layer may be provided between the polymer layer and the horizontal photo-alignment film, and/or between the horizontal photo-alignment film and the electrode. Usually, the polymer layer and the horizontal photo-alignment film are in contact with each other. In addition, preferably, each of the pair of substrates includes the horizontal photo-alignment film and the polymer layer. Preferably, the at least one of the pair of substrates further includes a linear electrode.

The horizontal photo-alignment film of the present invention is preferably, but not limited to, an alignment film having a property of aligning liquid crystal molecules adjacent thereto in a certain direction. The horizontal photo-alignment film also encompasses a film on which alignment treatment or the like is not performed and thus has no alignment property. In other words, the present invention is applicable to: polymer stabilization treatment to extend the BP temperature range in a polymer-stabilized blue phase (BP) display device in which alignment treatment is not required in the first place; a process for partially polymerizing a liquid crystal layer in a polymer dispersed liquid crystal (PDLC) display device; and other various applications. Specifically, the present invention is not only applicable to PS treatment to prevent image sticking, but is also applicable to other applications that require the formation of a polymer from a polymerizable monomer in a liquid crystal layer, as long as the present invention is a liquid crystal display panel including a polymer layer. Photo-alignment treatment is preferred as a method of performing alignment treatment because the effects of the present invention will be more significant, and excellent viewing angle characteristic can be obtained. Alignment treatment may also be performed by rubbing or the like.

The horizontal photo-alignment film achieves photo-alignment treatment that imparts an alignment property to the substrate surfaces through light irradiation with certain conditions. Hereinafter, a polymer film having a property of controlling the alignment of liquid crystal through photo-alignment treatment is also referred to as "photo-alignment film".

A polymer constituting the horizontal photo-alignment film is preferably polysiloxane, polyamide acid, or polyimide, in terms of heat resistance.

The horizontal photo-alignment film is a polymer film having anisotropy induced by polarized or non-polarized light irradiation and having a property of imparting an alignment regulating force to liquid crystal. More preferably, the horizontal photo-alignment film is a photo-alignment film on which photo-alignment treatment is performed by ultraviolet light, visible light, or both of them. The size of the pretilt angle that is imparted to the liquid crystal molecules by the photo-alignment film can be adjusted by the type of light, light irradiation time, irradiation direction, irradiation intensity, type of photofunctional groups, and the like. It should be noted that because the alignment is immobilized by the formation of the polymer layer, there is no need to prevent ultraviolet light or visible light from entering the liquid crystal layer after the production process, and thus the range of selection of the production processes is broadened. In addition, when the horizontal photo-alignment film having a property of aligning liquid crystal molecules vertically to irradiated polarized light is irradiated with p-polarized light in a normal direction of the substrate or in an oblique direction to the substrate, the pretilt angle is 0°.

The photoactive material is preferably a material of the photo-alignment film. The material of the photo-alignment film may be a single polymer or a mixture containing other molecules as long as the material has the property described above. For example, the material may also be a mixture obtained by adding other low molecular weight molecules such as additives or other photo-inactive polymers to a polymer containing a functional group having photo-alignment ability. As the material of the photo-alignment film, a material which induces photodissociation, photoisomerization, or photodimerization is selected. Generally, photoisomerization and photodimerization allow alignment at a longer wavelength with a smaller exposure dose and thus exhibit excellent mass productivity, compared to photodissociation. In other words, the photo-alignment film used in the present invention preferably includes a photoreactive functional group capable of undergoing photoisomerization or photodimerization. Representative materials that induce photoisomerization or photodimerization include azobenzene derivatives, cinnamoyl derivatives, chalcone derivatives, cinnamate derivatives, coumarin derivatives, diarylethene derivatives, stilbene derivatives, and anthracene derivatives. The material for photoisomerization or photodimerization is preferably a cinnamate group or a derivative thereof. In other words, the photo-alignment film preferably includes a functional group having a cinnamate derivative. The benzene ring that is present in these functional groups may be a heterocyclic ring. A representative material that induces photodissociation is a material including a cyclobutane skeleton. Examples thereof include polyimide including a cyclobutane ring. In one preferred embodiment of the present invention, a material of the photo-alignment film (a material constituting the photo-alignment film) includes a cyclobutane skeleton in a repeating unit.

The horizontal photo-alignment film may be a horizontal photo-alignment film irradiated with ultraviolet light from the outside of the liquid crystal cell. In this case, when the horizontal photo-alignment film is formed through photo-alignment treatment, and the polymer layer is formed through photopolymerization, it is preferred that the horizontal photo-alignment film and the polymer layer be simultaneously formed by using the same light. This provides a liquid crystal display panel with high production efficiency.

The polymer layer of the present invention is preferably a polymerized product of a monomer contained in the liquid crystal layer. In other words, the polymer layer is preferably the PS layer described above. Usually, the PS layer controls the alignment of liquid crystal molecules adjacent thereto. A polymerizable functional group of the monomer is preferably at least one selected from the group consisting of acrylate, methacrylate, vinyl, vinyloxy, and epoxy groups. Among these, an acrylate group and/or a methacrylate group is more preferred. These polymerizable functional groups are highly likely to produce radicals, and are effective in reducing manufacturing cycle time. In addition, the monomer preferably includes at least two polymerizable functional groups because the reaction efficiency is higher when the number of polymerizable functional groups is larger. Further, an upper limit of the number of polymerizable functional groups in the monomer is preferably four, so that the molecular weight is sufficiently reduced and the monomer can thus be easily dissolved in liquid crystal. In addition, the monomer is preferably a monomer that initiates polymerization by light irradiation (i.e., photopolymerization) or a monomer that initiates polymerization by heating (i.e., thermal polymerization). In other words, the polymer layer is preferably formed by photopolymerization or thermal polymerization. Photopolymerization is particularly preferred because the polymerization reaction can be easily initiated at normal temperature. The light used for photopolymerization is preferably ultraviolet light, visible light, or a combination thereof.

In the present invention, the type of polymerization reaction to form the PS layer is not particularly limited, and examples thereof include step-growth polymerization in which a bifunctional monomer is polymerized stepwise while forming a new bond; and chain polymerization in which a monomer is sequentially bonded to active species generated from a small amount of catalyst (initiator) and are grown in a chain reaction. Examples of the step-growth polymerization include polycondensation and polyaddition. Examples of the chain polymerization include radical polymerization and ionic polymerization (for example, anionic polymerization and cationic polymerization).

The polymer layer improves the alignment regulating force of the horizontal photo-alignment film on which alignment treatment has been performed, and can reduce the occurrence of image sticking in display. In addition, in the case where a voltage of a threshold or higher is applied to the liquid crystal layer to polymerize a monomer in a state where liquid crystal molecules are aligned at a pre-tilt angle so as to form a polymer layer, the thus-obtained polymer layer includes a structure that allows the liquid crystal molecules to be aligned at a pre-tilt angle with respect to the polymer layer.

The pair of substrates included in the liquid crystal display panel of the present invention is used for interposing a liquid crystal layer therebetween. Each substrate is produced by, for example, forming a wiring, an electrode, a color filter, and the like on an insulating substrate as a base formed of glass, resin, or the like. The electrode can be suitably selected in accordance with the alignment mode and the like. Preferred examples thereof include a linear electrode.

The alignment mode of the liquid crystal layer is preferably an alignment mode in which a horizontal alignment film can be used. Preferred examples thereof include in-plane switching (IPS), fringe field switching (FFS), optically compensated birefringence (OCB), twisted nematic (TN), super twisted nematic (STN), ferroelectrics liquid crystal (FLC), anti-ferroelectrics liquid crystal (AFLC), polymer dispersed liquid crystal (PDLC), and polymer network liquid crystal (PNLC) modes. Among these, the IPS, FFS, FLC, and AFLC modes are more preferred, and the IPS and FFS modes are still more preferred. In addition, a blue phase mode in which the formation of an alignment film is unnecessary is also preferred as the above alignment mode. Further, a mode in which the at least one of the pair of substrates includes a multi-domain structure for improving viewing angle characteristic is also preferred as the above alignment mode. The multi-domain structure refers to a structure including plural areas in which the liquid crystal molecules have different alignment forms (for example, in terms of bend directions in the OCB mode or twist directions in the TN and STN modes) or different alignment directions during either or both voltage application and non-voltage application. Forming the multi-domain structure actively requires patterning of an electrode into an appropriate form, and/or irradiation of a photoactive material with light using a photomask or the like.

As described above, the present invention is suitably applicable for display devices having excellent viewing angles such as an IPS mode or an FFS mode. A technique that provides good viewing angles is required in applications such as medical monitors, electronic books, smartphones, and the like.

The present invention also provides a liquid crystal display device including the liquid crystal display panel of the present invention. Preferred embodiments of the liquid crystal display panel included in the liquid crystal display device of the present invention are the same as those of the liquid crystal display panel of the present invention described above. In one preferred embodiment of the present invention, the liquid crystal display device of the present invention is a liquid crystal display device of an IPS mode. In another preferred embodiment of the present invention, the liquid crystal display device of the present invention is a liquid crystal display device of an FFS mode. The liquid crystal display device of an IPS mode is a liquid crystal display device of a horizontal electric field mode in which, usually, one of the pair of substrates includes two types of electrodes, which are opposed to each other when the main surface of the substrate is viewed in plane. In addition, the liquid crystal display device of an FFS mode is a liquid crystal display device of a fringe electric field mode in which, usually, one of the pair of substrates includes a planar electrode, and a slit electrode disposed in a layer different from a layer including the planar electrode, with an insulation layer between these layers. These liquid crystal display devices are described in further detail in embodiments.

As long as the above-described constituent elements are included as essential elements, the liquid crystal display panel and the liquid crystal display device of the present invention are not particularly limited by other constituent elements, and may appropriately include other elements that are commonly included in liquid crystal display panels and liquid crystal display devices.

Each of the embodiments described above may be appropriately combined without departing from the scope of the present invention.

Advantageous Effects of Invention

The present invention provides a liquid crystal display panel and a liquid crystal display device having excellent display quality, with reduced string-like defects that occur in display pixels. When the present invention is applied to, for example, a liquid crystal display device of an IPS mode or an FFS mode including a photo-alignment film, an excellent viewing angle is achieved owing to the properties of a photo-alignment film, and the effect of reducing image sticking is also achieved at the same time.

DESCRIPTION OF EMBODIMENTS

Figure 1:
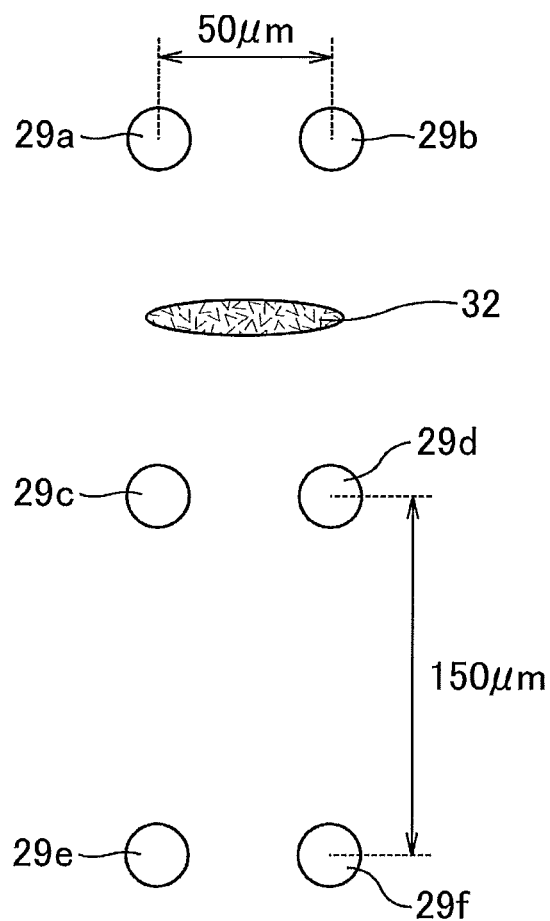
FIG. 1 is a planar schematic diagram showing spacer arrangement and alignment of liquid crystal molecules in a liquid crystal display panel according to Embodiment 1.

Hereinafter, the present invention is described in further detail by explaining embodiments with reference to the drawing, but is not limited to these embodiments. The term "pixel" as used herein may refer to a subpixel, unless otherwise specified. In addition, the substrate including a thin film transistor element is also referred to as a TFT substrate, and a color filter substrate is also referred to as a CF substrate. In the embodiments, string-like defects were measured by observing every pixel of a panel prepared, under a polarizing microscope. Members and parts having the same functions are denoted by the same reference numerals except for the hundred's digit throughout the embodiments, unless otherwise specified. The terms "or more" and "or less" as used herein are inclusive. In other words, the term "or more" means "greater than and equal to" the value specified.

Embodiment 1

FIG. 1 is a planar schematic diagram showing spacer arrangement and alignment of liquid crystal molecules in a liquid crystal display panel according to Embodiment 1. In the present embodiment, the photospacers are arranged at regular intervals of 150 µm in the longitudinal direction and 50 µm in the transverse direction. The photospacers are regularly located at the intersections of the grid in which the vertical length of the unit cell is 150 µm and the horizontal length of the unit cell is 50 µm. The spacers are preferably arranged so as to be superimposed with the black matrix. In addition, it is more preferred that the black matrix be arranged in a grid pattern, and the spacers be arranged so as to be superimposed with the intersections of the grid-like black matrix. Herein, the sections partitioned by the grid-like black matrix may be pixels.

As described later, for liquid crystal alignment treatment, these substrates were irradiated with linearly polarized ultraviolet light having a wavelength of 313 nm and an intensity of 5 J/cm² from the normal direction of the substrates. An angle formed between a line connecting two nearest adjacent photospacers (a photospacer 29a and a photospacer 29b) and a polarization direction (not shown) is 90°. In other words, the angle formed between a line connecting the photospacer 29a and the photospacer 29b and a liquid crystal alignment direction 32 at a voltage lower than a threshold voltage is 0°, and the line connecting the two nearest adjacent photospacers is parallel to the liquid crystal alignment direction. The advantageous effects of the present invention can be achieved by the liquid crystal display panel, wherein in a plan view of the main surface of the pair of substrates, the spacers are arranged such that the inter-spacer distance between the adjacent spacers in the longitudinal direction is different from that in the transverse direction, and the angle formed between the line connecting the spacers with a shorter inter-spacer distance than the other inter-spacer distance and the alignment direction of the liquid crystal molecules at a voltage lower than a threshold voltage in the liquid crystal layer is substantially 0°.

Figure 2:
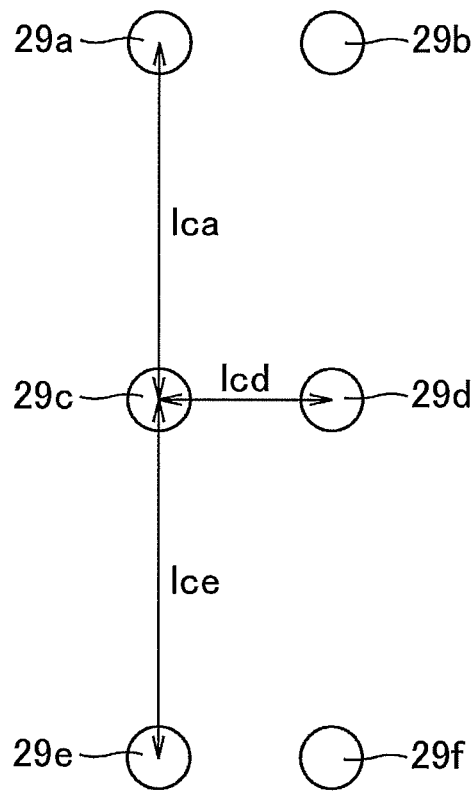
FIG. 2 is a planar schematic diagram showing spacer arrangement in a liquid crystal display panel according to Embodiment 1.

FIG. 2 is a planar schematic diagram showing spacer arrangement in a liquid crystal display panel according to Embodiment 1. The present invention may be configured as follows: when a total of three spacers that are adjacent in the longitudinal and transverse directions are selected in a plan view of the main surface of the pair of substrates, the inter-spacer distance between the adjacent spacers in the longitudinal direction is different from that in the transverse direction; and the angle formed between the line connecting the spacers with a shorter inter-spacer distance and the alignment direction of the liquid crystal molecules at a voltage lower than a threshold voltage in the liquid crystal layer is 20° or smaller. For example, when three spacers (the photospacer 29a, a photospacer 29c, and a photospacer 29d) are selected, an inter-spacer distance $l_{ca}$ between the adjacent photospacers 29a and 29c in the longitudinal direction may be different from an inter-spacer distance $l_{cd}$ between the adjacent photospacers 29c and 29d in the transverse direction, and an angle formed between a line connecting the photospacers 29c and 29d with the shorter inter-spacer distance $l_{cd}$ and the alignment direction of the liquid crystal molecules at a voltage lower than a threshold voltage in the liquid crystal layer may be 20° or smaller. In addition, when three spacers (the photospacer 29c, the photospacer 29d, and a photospacer 29e) are selected, an inter-spacer distance $l_{ce}$ between the adjacent photospacers 29c and 29e in the longitudinal direction may be different from an inter-spacer distance $l_{cd}$ between the neighboring photospacers 29c and 29d in the transverse direction, and an angle formed between a line connecting the photospacers 29c and 29d with the shorter inter-spacer distance $l_{cd}$ and the alignment direction of the liquid crystal molecules at a voltage lower than a threshold voltage in the liquid crystal layer may be 20° or smaller.

In the case where the spacers are not regularly arranged at regular intervals in either longitudinal or transverse direction (for example, the length is different between $l_{ca}$ and $l_{ce}$: $l_{ca}$ is longer than $l_{cd}$, and $l_{ce}$ is shorter than $l_{cd}$), the direction of a line connecting the spacers with a shorter inter-spacer distance may differ, depending on how spacers adjacent to a reference spacer in the longitudinal and transverse directions are selected after such a reference spacer is selected. In this case, a line connecting the spacers with the shortest inter-spacer distance among the inter-spacer distances between adjacent spacers in the longitudinal and transverse directions may be regarded as "a line connecting the spacers with a shorter inter-spacer distance".

Figure 3:
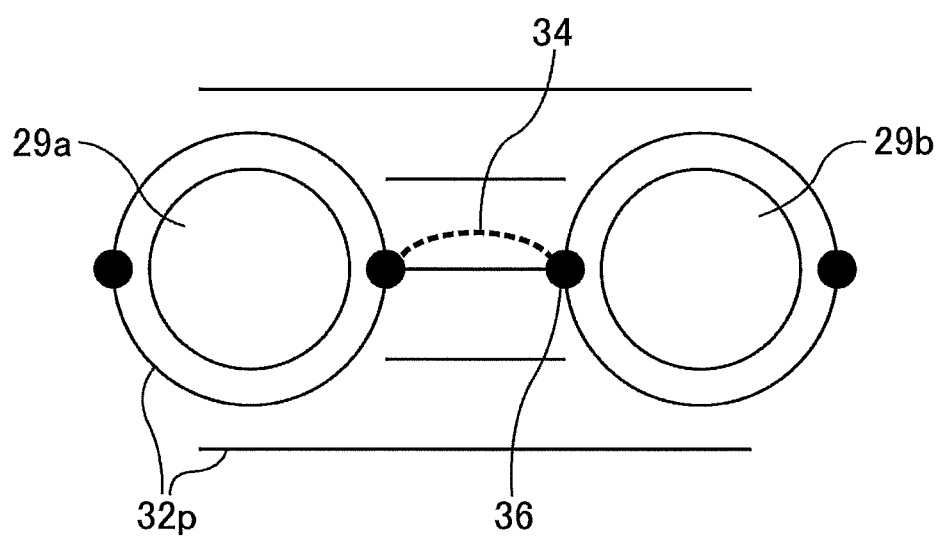
FIG. 3 is a view showing alignment and alignment singularities of liquid crystal molecules in a liquid crystal display panel according to Embodiment 1.

FIG. 3 is a view showing alignment and alignment singularities of liquid crystal molecules in a liquid crystal display panel according to Embodiment 1. A string-like defect 34 easily occurs between the nearest adjacent photospacers (between the photospacer 29a and the photospacer 29b). This is because the length of the string-like defect 34 increases in proportion to the energy of the defect, and the shorter the string-like defect 34, the more energetically stable it becomes. In Embodiment 1, the photospacers are located at the intersections of a grid in which the vertical length of the unit cell is 150 µm and the horizontal length of the unit cell is 50 µm. Thus, the string-like defect 34 easily occurs between the photospacers arranged at shorter intervals of 50 µm.

Generally, PI (polyimide) is hardly attached around the photospacers. Thus, the liquid crystal molecules are aligned along the photospacers (see a liquid crystal alignment direction 32p in FIG. 3). In the case where a photo-alignment treatment has been performed, alignment singularities 36 are present at the three o'clock position (right side) and the nine o'clock position (left side) of the photospacers 29a and 29b, as shown in FIG. 3 in Embodiment 1. In Embodiment 1, the string-like defect 34 does not project to the outside of the black matrix (BM), and the string-like defects that occur in display pixels can be sufficiently reduced, compared to the later-described Comparative Example 1.

Figure 4:
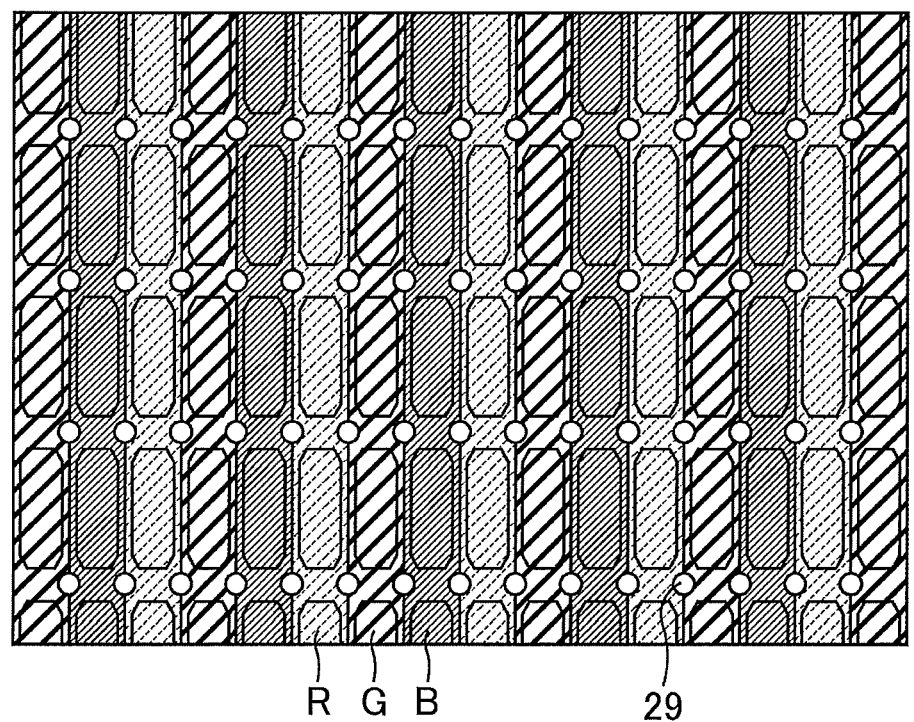
FIG. 4 is a planar schematic diagram showing a counter substrate according to Embodiment 1.

FIG. 4 is a planar schematic diagram showing a counter substrate (CF substrate) according to Embodiment 1. Spacers 29 are arranged at intervals of 150 µm in the longitudinal direction and 50 µm in the transverse direction on the black matrix (BM). These spacers cannot be observed with transmitted light (in FIG. 4, the spacers were observed with reflected light).

Figure 5:
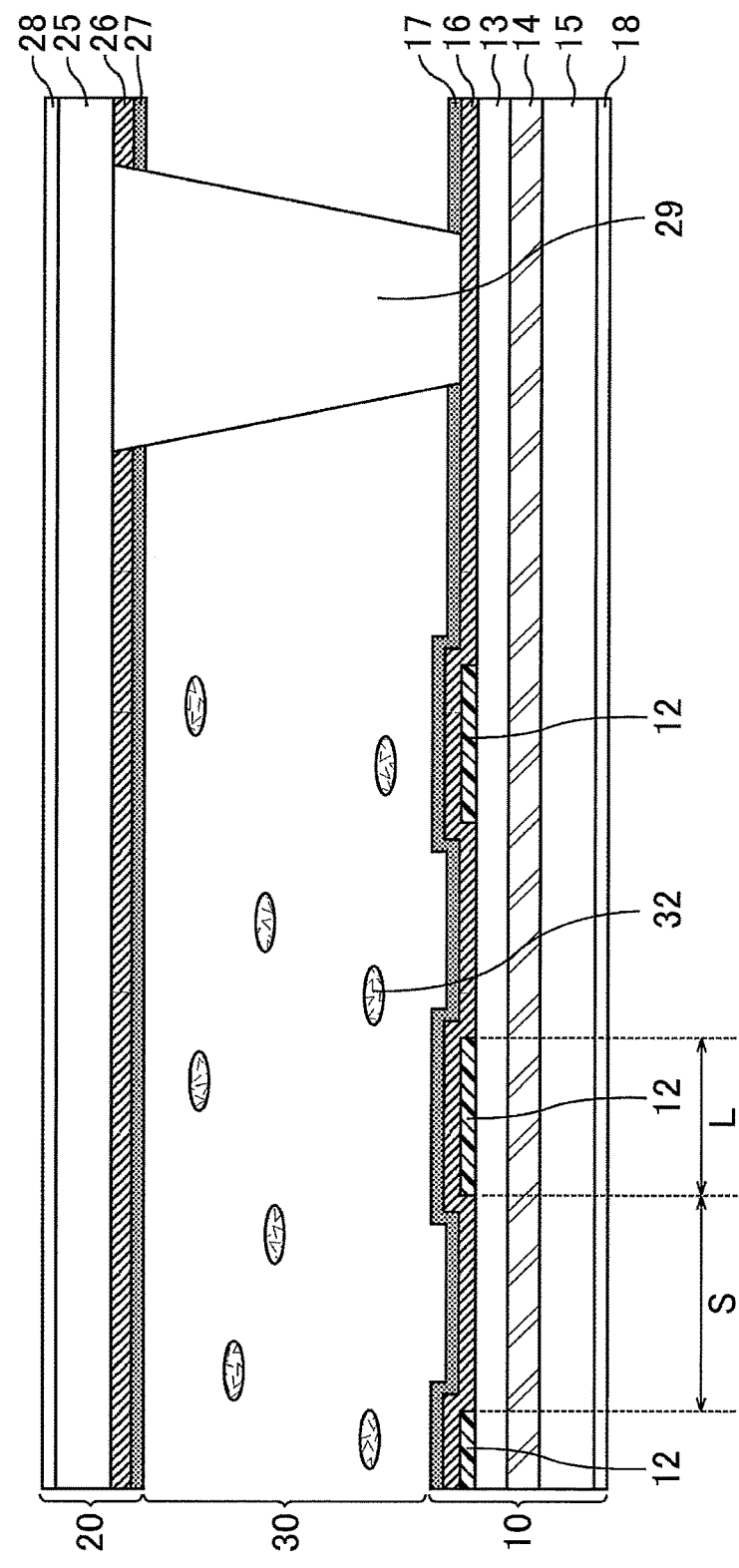
FIG. 5 is a cross-sectional schematic diagram showing a liquid crystal display panel according to Embodiment 1.

FIG. 5 is a cross-sectional schematic diagram showing a liquid crystal display panel according to Embodiment 1. As shown in FIG. 5, the liquid crystal display panel of Embodiment 1 includes a pair of substrates consisting of a TFT substrate 10 and a CF substrate 20, and a liquid crystal layer 30 interposed between the pair of substrates. The TFT substrate 10 includes: an insulating transparent substrate 15 formed of glass or the like; a slit electrode 12 on an upper layer; a lower layer electrode 14 on a lower layer; and an insulation layer 13 between the slit electrodes 12 and the lower layer electrode (planar electrode) 14. Usually, the slit electrode 12 on the upper layer is a signal electrode, and the lower layer electrode 14 is a common electrode. The electrode on the upper layer may be, for example, a pair of combteeth electrodes, instead of the slit electrode. The CF substrate 20 includes an insulating transparent substrate 25 formed of glass or the like; a color filter (not shown) formed on the transparent substrate 25; and a black matrix (not shown) formed on the same. Other elements such as a common electrode may further be included, if necessary. For example, although the FFS mode as in Embodiment 1 includes the electrodes (the slit electrode 12 and the lower layer electrode 14) only on the TFT substrate 10 as shown in FIG. 5, the present invention is applicable to other modes, and in that case, the electrodes are formed on both of the TFT substrate 10 and the counter substrate 20, if necessary.

The TFT substrate 10 also includes an alignment film (horizontal photo-alignment film) 16, and the CF substrate 20 also includes an alignment film (horizontal photo-alignment film) 26. The alignment films 16 and 26 are films mainly including polyimide, polyamide, polyvinyl, polysiloxane, and the like. Forming these alignment films allows liquid crystal molecules to be aligned in a certain direction.

Prior to a PS polymerization process, the liquid crystal layer 30 contains a polymerizable monomer. The polymerizable monomer initiates polymerization by the PS polymerization process to form PS layers 17 and 27 on the alignment films 16 and 26, respectively, as shown in FIG. 5, thus improving the alignment regulating force of the alignment films 16 and 26.

The PS layers 17 and 27 can be formed by injecting a liquid crystal composition containing a liquid crystal material and a polymerizable monomer into a gap between the TFT substrate 10 and the counter substrate 20, and by irradiating the liquid crystal layer 30 with a certain amount of light or applying heat thereto to polymerize the polymerizable monomer. At this time, the polymerization is performed in a state where no voltage or a voltage less than the threshold is applied to the liquid crystal layer 30 so as to form the PS layers 17 and 27 that retain the initial alignment of the liquid crystal molecules. As a result, the PS layers 17 and 27 each having higher alignment stability can be achieved. A polymerization initiator may be added to the liquid crystal composition, if necessary.

The liquid crystal display panel according to Embodiment 1 includes the TFT substrate 10, the liquid crystal layer 30, and the counter substrate 20, which are laminated in the stated order from a back surface to an observation surface side of the liquid crystal display device. Linear polarizing plates 18 and 28 are disposed on the back surface side of the TFT substrate 10 and the observation surface side of the counter substrate 20, respectively. Each of these linear polarizing plates 18 and 28 may further be provided with a retarder, and may be a circularly polarizing plate.

The liquid crystal display panel according to Embodiment 1 may include a color-filter-on-array structure in which a color filter is disposed on the TFT substrate 10 instead of on the counter substrate. The liquid crystal display panel according to Embodiment 1 may also be a monochrome display device or a field sequential color device. In that case, the color filter is unnecessary.

The liquid crystal layer 30 is filled with a liquid crystal material having a property of being aligned in a specific direction when a certain voltage is applied thereto. The alignment of liquid crystal molecules in the liquid crystal layer 30 is controlled by the application of a threshold or higher voltage.

Figure 6:
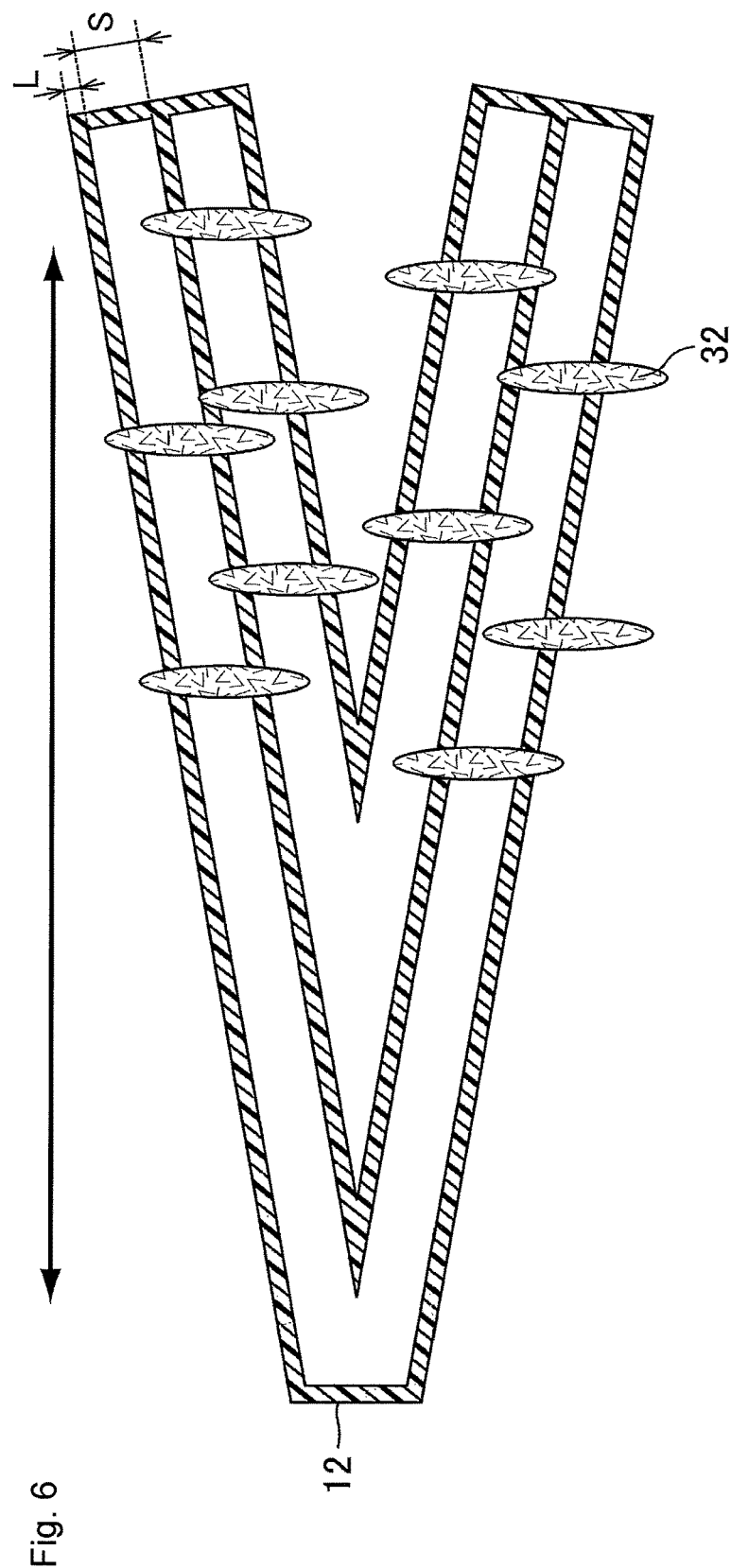
FIG. 6 is a planar schematic diagram showing a slit electrode according to Embodiment 1.

FIG. 6 is a planar schematic diagram showing a slit electrode according to Embodiment 1. As shown in FIG. 6, the slit portion of the slit electrode 12 is formed such that the linear portions of the electrode are extended substantially in parallel to each other and linearly. In FIG. 6, the polarization direction of irradiated ultraviolet light is tilted 10° from the longitudinal direction of the electrode. The double-headed arrow in FIG. 6 shows the polarization direction of irradiation (in the case where negative liquid crystal molecules are used). The pixel according to Embodiment 1 has two domains, so that the slit is bent, as shown in FIG. 6. Indium tin oxide (ITO) was used as an electrode material. Other known materials such as indium zinc oxide (IZO) can also be used.

Hereinafter, an example of actual production of the liquid crystal display panel according to Embodiment 1 is described.

A 10-inch IGZO-TFT substrate including an FFS structure, and a CF substrate as a counter substrate were provided, and a polyvinyl cinnamate solution was applied to both substrates by spin coating. The IGZO-TFT substrate is a thin film transistor array substrate in which indium gallium zinc complex oxide is used as a semiconductor. In addition, the width L of the slit electrode on the upper layer was 3 µm, and the distance between the linear portions of the electrode (slit width S) was 5 µm (L/S=3 µm/5 µm). The polyvinyl cinnamate solution was prepared by dissolving 3% by weight of polyvinyl cinnamate in a solvent obtained by mixing N-methyl-2-pyrrolidone and ethylene glycol monobutyl ether in equal amount. After application by spin coating, the alignment film was temporarily dried at 80° C. for 3 minutes, and then baked at 200° C. for 40 minutes while purging nitrogen gas. The alignment film (the uppermost layer, i.e., the layer closest to the liquid crystal layer) on the transparent electrode on the TFT substrate has a film thickness of 45 nm in the active area. The alignment film on the CF substrate has a film thickness of 50 nm in the active area. The diameter of each photospacer formed on the CF substrate is 17 µm, as measured on the bottom (base).

These substrates were irradiated with linearly polarized ultraviolet light having a wavelength of 313 nm and an intensity of 5 J/cm$^2$ from the normal direction of the substrates for liquid crystal alignment treatment. As described above, the angle formed between the line connecting two nearest adjacent photospacers (the photospacer 29a and the photospacer 29b) and the polarization direction (not shown) is 90°. In other words, the angle formed between the line connecting the photospacer 29a and the photospacer 29b and the liquid crystal alignment direction 32 is 0°, and the line connecting the two nearest adjacent photospacers is parallel to the liquid crystal alignment direction.

Next, a thermosetting seal (HC1413FP: manufactured by Mitsui Chemicals, Inc.) was printed on the TFT substrate by using a screen plate. The height of each photospacer is set such that the liquid crystal layer in the active area has a thickness of 3.5 µm. These two kinds of substrates were bonded to each other such that the polarization direction of irradiated ultraviolet light is consistent between the substrates. Next, the bonded substrates were heated at 130° C. for 60 minutes in a nitrogen-purged furnace while applying a pressure of 0.5 kgf/cm$^2$ thereto, and the seal was thus cured.

Liquid crystal was injected under vacuum into a panel produced by above-described method. In the present embodiment, a mixture, which was obtained by adding 5% by weight of trans-4-propyl-4'-vinyl-1,1'-bicyclohexane to 100% by weight of MLC-6610 (manufactured by Merck KGaA) and by further adding 1% by weight of biphenyl-4, 4'-diyl bis(2-methylacrylate) as a polymerizable additive (a material (monomer) of the PS layer) thereto, was used as the liquid crystal. An inlet of a cell through which the liquid crystal was injected was sealed with an epoxy adhesive (ARALDITE AR-530, manufactured by NICHIBAN Co., Ltd.). At this time, the electrodes were short-circuited and the charge removing on the glass surface was performed so that the liquid crystal alignment would not be disturbed by an external electric field. Next, in order to remove the liquid crystal flow alignment and to simulate the curing of the seal in the one drop fill (ODF) process during mass production, the panel was heated at 130° C. for 40 minutes to transform liquid crystal into the isotropic phase for realignment treatment. As a result, a liquid crystal display panel of an FFS mode in which the liquid crystal molecules were uniaxially aligned in a direction perpendicular to the polarization direction of ultraviolet light with which the alignment films were irradiated was obtained. All the processes were performed under yellow fluorescent light to prevent the liquid crystal panel from being exposed to ultraviolet light emitted from a fluorescent lamp. Subsequently, in order to perform PS treatment on this panel, the panel was irradiated with ultraviolet light (1.5 J/cm$^2$) by using a black light (FHF32BLB, manufactured by TOSHIBA Corporation). As a result, biphenyl-4,4'-diyl bis(2-methylacrylate) was polymerized. This liquid crystal panel was observed for the presence of string-like defects under a microscope. Only about 40 string-like defects were present, i.e., the number sharply decreased, compared to the later-described Comparative Example 1.

The liquid crystal display device including the above-described liquid crystal display panel of Embodiment 1 may further appropriately include other members (for example, light source such as a back light) that are included in common liquid crystal display devices. The liquid crystal display device of Embodiment 1 is suitably applicable to TV panels, digital signage, medical monitors, electronic books, PC monitors, portable terminal panels, and the like. Liquid crystal display panels according to the later-described embodiments are also applicable in the same manner.

The type of the liquid crystal display device according to Embodiment 1 may be any of transmissive type, reflective type, and reflective-transmissive combination type. In the case of the transmissive or reflective-transmissive combination type, the liquid crystal display device of Embodiment 1 includes a back light. The back light is disposed on the back surface side of the liquid crystal cell such that the light is transmitted through the TFT substrate 10, the liquid crystal layer 30, and the counter substrate 20 in the stated order. In the case of the refractive or reflective-transmissive combination type, the TFT substrate 10 includes a reflector to reflect outside light. In addition, the polarizing plate on the counter substrate 20 must be a circularly polarizing plate at least in the area where the reflected light is used as display light.

The liquid crystal display device according to Embodiment 1 is disassembled, and the collected liquid crystal is enclosed in a cell. In this way, the elastic constant can be measured by using EC-1 manufactured by TOYO Corporation. The measurement temperature is 20° C. In addition, a chemical analysis using gas chromatograph mass spectrometry (GC-MS), time-of-flight secondary ion mass spectrometry (TOF-SIMS), and the like can be carried out to analyze the components of a horizontal photo-alignment film and the components in the polymer layer. Furthermore, the cross-sectional shape of a liquid crystal cell containing an alignment film and a PS layer can be confirmed by microscopic observation using a scanning transmission electron microscope (STEM), a scanning electron microscope (SEM), or the like.

Modified Example of Embodiment 1

Figure 7:
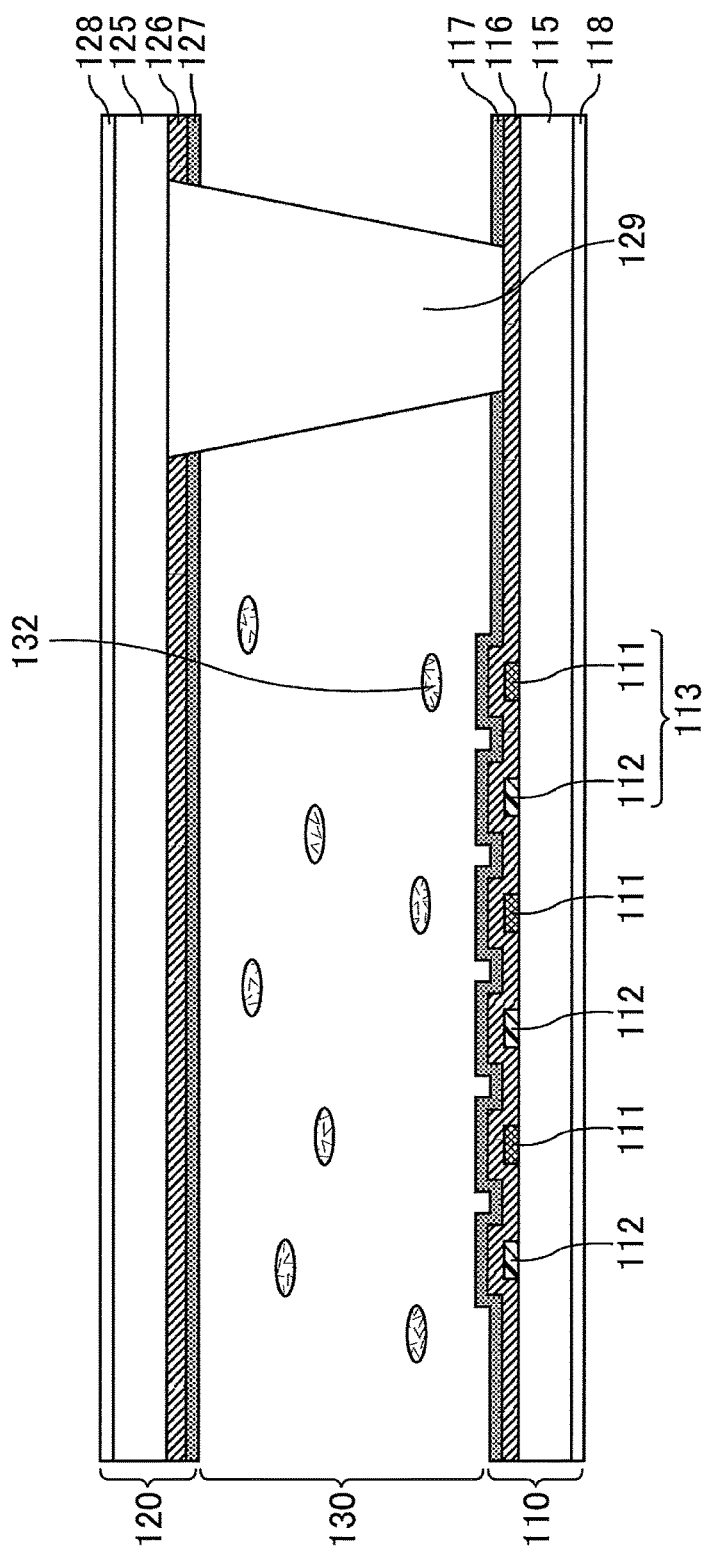
FIG. 7 is a cross-sectional schematic diagram showing an embodiment of a liquid crystal display panel according to a modified example of Embodiment 1.
Figure 8:
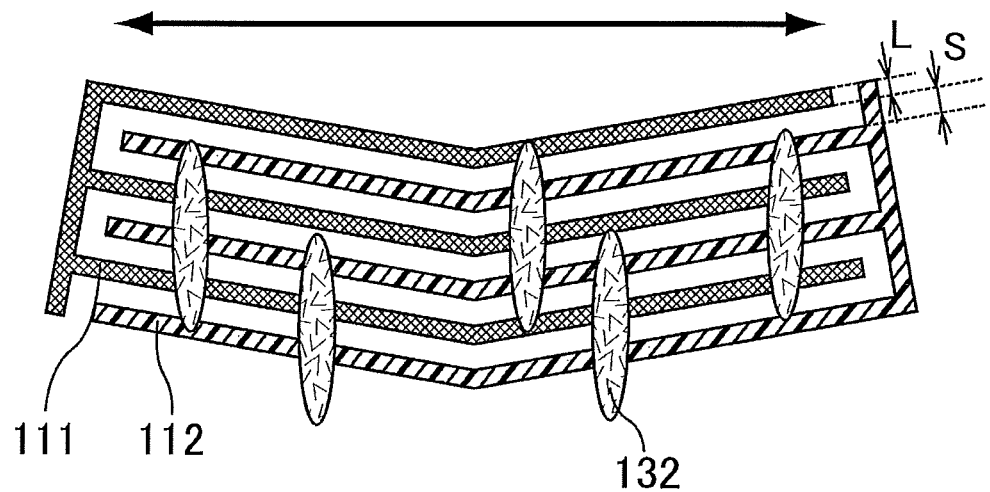
FIG. 8 is a planar schematic diagram showing a pair of combteeth electrodes according to a modified example of Embodiment 1.

FIG. 7 is a cross-sectional schematic diagram showing an embodiment of a liquid crystal display panel according to a modified example of Embodiment 1. FIG. 8 is a planar schematic diagram showing a pair of combteeth electrodes according to a modified example of Embodiment 1. The modified example of Embodiment 1 relates to a liquid crystal display panel of an IPS mode.

In FIG. 7, a TFT substrate 110 includes an insulating transparent substrate 115 formed of glass or the like, and further includes signal electrodes 111 (signal electrodes), common electrodes 112, various wiring, TFTs, and the like, which are formed on the transparent substrate 115. For example, in the case of a liquid crystal display panel of an IPS mode as in the modified example of Embodiment 1, pairs of combteeth electrodes 113 (consisting of the signal electrodes 111 and the common electrodes 112) are formed only in the TFT substrate 110, as shown in FIG. 7.

The pair of combteeth electrodes 113 is formed such that, as shown in FIG. 8, the signal electrode 111 and the common electrode 112 are extended substantially in parallel to each other and bent. Thereby, when an electric field is applied, the electric field vector is substantially perpendicular to the length direction of the electrodes, and a multi-domain structure is thus formed, providing favorable viewing angle characteristic. The double-headed arrow in FIG. 8 indicates the polarization direction of irradiation (in the case of using negative type liquid crystal molecules), in the same manner as described above for FIG. 6.

Other elements of the modified example of Embodiment 1 are the same as those of Embodiment 1 described above. The advantageous effects of the present invention can also be achieved by such a liquid crystal display panel of an IPS mode. The present invention is also applicable to liquid crystal display panels of other modes such as FLC and AFLC modes.

Embodiment 2

Embodiment 2 is the same as Embodiment 1, except that an angle formed between a line connecting two nearest adjacent photospacers and an alignment direction of liquid crystal molecules at a voltage lower than a threshold voltage in the liquid crystal layer is 20°. This liquid crystal panel was observed for the presence of string-like defects under a microscope. Only about 50 string-like defects were present, i.e., the number sharply decreased.

Embodiment 3

Embodiment 3 is the same as Embodiment 1, except that the diameter of the bottom (base) of each photospacer formed on the CF substrate was changed to 14 µm. This liquid crystal panel was observed for the presence of string-like defects under a microscope. Only about 20 string-like defects were present.

Embodiment 4

Embodiment 4 is the same as Embodiment 1, except that the diameter of the bottom (base) of each photospacer formed on the CF substrate was changed to 12 µm. This liquid crystal panel was observed for the presence of string-like defects under a microscope. Only about five string-like defects were present. The results of Embodiments 3 and 4 indicate that the diameter of each photospacer formed on the CF substrate as measured on the bottom (base) is preferably 14 µm or less and more preferably 12 µm or less.

In the liquid crystal display devices of a PS-FFS (PS-treated FFS) mode of Embodiments 1 to 4 described above and the liquid crystal display device of a PS-IPS (PS-treated IPS) mode of the modified example of Embodiment 1 described above, alignment of the liquid crystal molecules by photo-alignment is more preferred than alignment thereof by rubbing because it can suppress the alignment unevenness and the generation of dust. Photo-alignment is further preferred because it does not cause a pretilt in liquid crystal, unlike rubbing, and provides good viewing angle characteristic. However, because the horizontal photo-alignment film generally has a weak alignment regulating force, severe image sticking is observed, which makes mass production difficult. (Herein, the horizontal photo-alignment film refers to the horizontal alignment film that is also a photo-alignment film. It aligns liquid crystal molecules substantially horizontally to the substrate; contains a functional group that causes photoisomerization, photodimerization, photodissociation in molecules of the alignment film by light irradiation; and is also capable of aligning the liquid crystal molecules by polarized light irradiation.) Thus, the present inventors solved this problem through PS (polymer sustained) treatment. However, the horizontal photo-alignment film, in particular, can be a factor that causes string-like defects because of its weak alignment regulating force. The present inventors successfully solved this problem by selecting a suitable direction of liquid crystal alignment. Thus, it is considered that the present invention also provides a very simple method of achieving a photo-aligned IPS mode.

In the actual usage, in the case of an application that involves exposure to visible light (for example, in the case of a liquid crystal TV), the use of visible light for alignment treatment of the photo-alignment film should be avoided as much as possible. However, in the embodiments described above, the alignment film surface is covered by the PS layer as a result of PS treatment, and the alignment is thus immobilized. This is advantageous in that a material whose sensitivity wavelength includes a visible light wavelength range may be used as the material of the photo-alignment film.

Conventionally, an ultraviolet absorption layer needed to be provided in order to prevent exposure to weak ultraviolet light from a back light and the surrounding environment, even when the sensitivity wavelength of the material of the photo-alignment film included an ultraviolet wavelength range. In this respect, the present invention provides another advantage in that the PS process eliminates the need to provide an ultraviolet absorption layer.

When PS treatment is performed by using ultraviolet light, the voltage holding ratio (VHR) may decrease due to irradiation of liquid crystal with ultraviolet light. However, efficient PS treatment as in the embodiments described above can reduce the ultraviolet irradiation time, and a decrease in the voltage holding ratio can thus be avoided.

In addition, the PS exposure dose (time) can be decreased because of reduced image sticking. In the production of liquid crystal panels, a decrease in the exposure dose (time) results in an increase in the throughput. Furthermore, because the irradiation apparatus can be made smaller, it leads to a reduction in the capital investment.

The irradiation of linearly polarized ultraviolet light for photo-alignment treatment in the above-described embodiments is performed before the bonding of the pair of substrates. However, the pair of substrates may be bonded first, and then photo-alignment treatment may be performed from the outside of the liquid crystal cell. It does not matter whether photo-alignment treatment is performed before or after liquid crystal filling; however, when photo-alignment treatment by irradiation of linearly polarized ultraviolet light is performed after liquid crystal filling, it makes it possible to simultaneously perform photo-alignment treatment and the PS process, which advantageously reduces the process time.

Comparative Example 1

Figure 9:
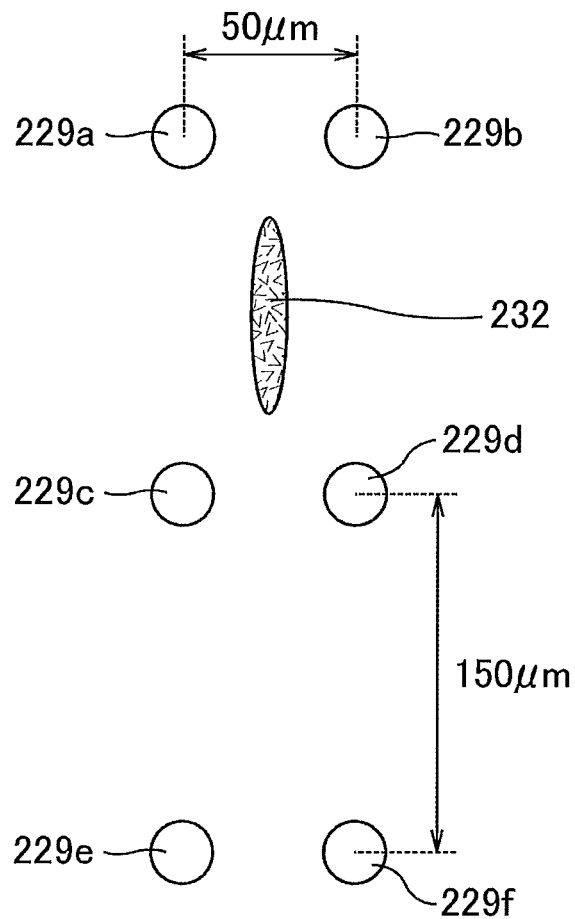
FIG. 9 is a planar schematic diagram showing spacer arrangement and alignment of liquid crystal molecules in a liquid crystal display panel according to Comparative Embodiment 1.

FIG. 9 is a planar schematic diagram showing spacer arrangement and alignment of liquid crystal molecules in a liquid crystal display panel according to Comparative Embodiment 1. In Comparative Example 1, the photospacers are arranged at regular intervals of 150 µm in the longitudinal direction and 50 µm in the transverse direction. The photospacers are regularly located at the intersections of the grid in which the vertical length of the unit cell is 150 µm and the horizontal length of the unit cell is 50 µm. Herein, the sections partitioned by the grid-like black matrix may be pixels.

An angle formed between a line connecting spacers (a photospacer 229a and a photospacer 229b) with a shorter inter-spacer distance and the liquid crystal alignment direction 32 is 90°. The line connecting the two nearest adjacent photospacers is perpendicular to the liquid crystal alignment direction. As described above, in a plan view of the main surface of the pair of substrates, the liquid crystal display panel includes the spacers that are arranged such that the inter-spacer distance between the adjacent spacers in the longitudinal direction is different from that in the transverse direction; and the angle formed between the line connecting the spacers with a shorter inter-spacer distance than the other inter-spacer distance and the alignment direction of the liquid crystal molecules at a voltage lower than a threshold voltage in the liquid crystal layer is substantially 90°. Other elements of Comparative Example 1 are the same as those of Embodiment 1 described above. This liquid crystal panel was observed for the presence of string-like defects under a microscope, and 200 or more string-like defects were observed.

Figure 10:
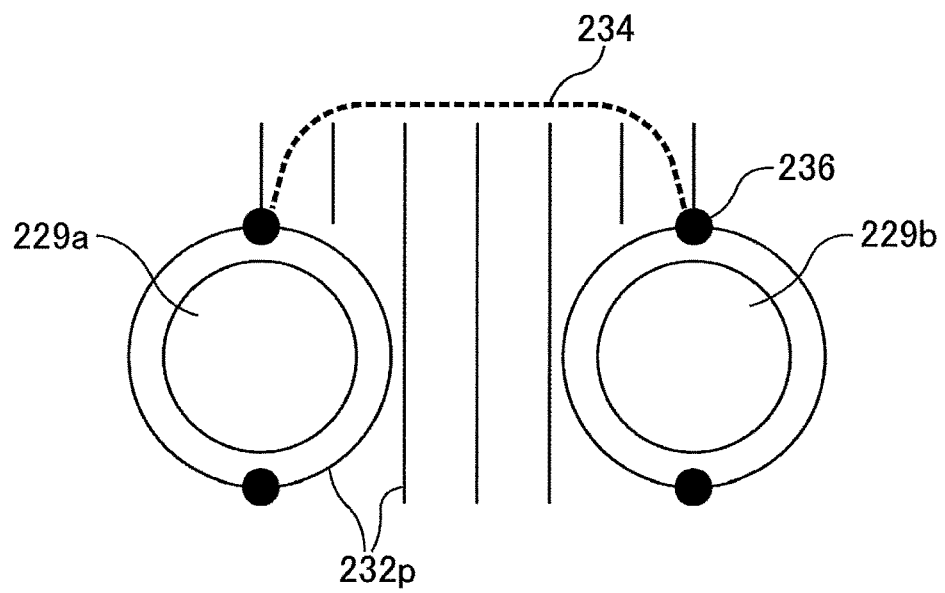
FIG. 10 is a view showing alignment and alignment singularities of liquid crystal molecules in a liquid crystal display panel according to Comparative Embodiment 1.
Figure 11:
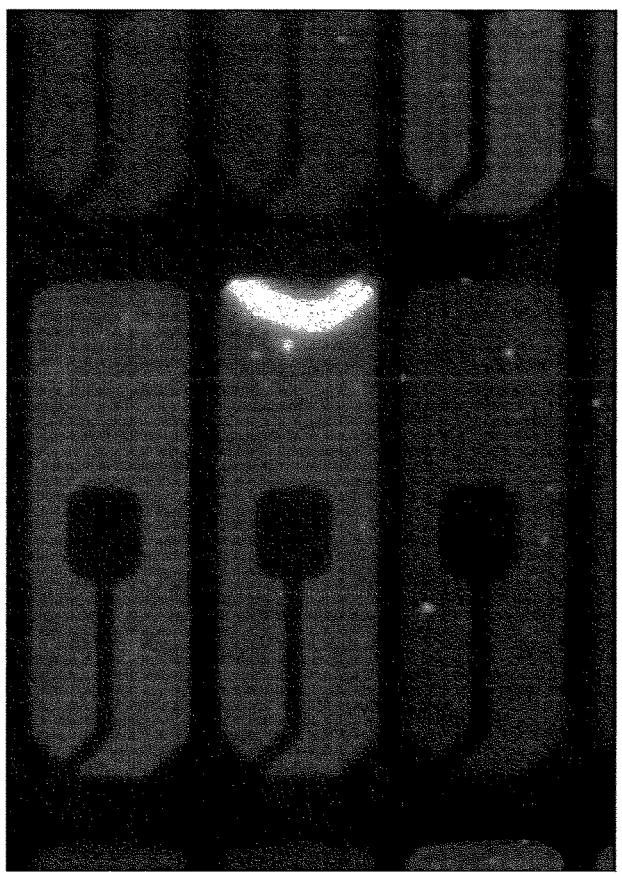
FIG. 11 is an image showing a display area of a liquid crystal display panel according to Comparative Example 1.

FIG. 10 is a view showing alignment and alignment singularities of liquid crystal molecules in a liquid crystal display panel according to Comparative Embodiment 1. FIG. 11 is an image showing a display area of a liquid crystal display panel according to Comparative Example 1.

In Comparative Example 1, alignment singularities 236 are present at the twelve o'clock position (top side) and the six o'clock position (bottom side) of a photospacer as shown in FIG. 10. When a string-like defect 234 occurs, such a string-like defect 234 is an alignment defect, and always has the alignment singularity 236 at each end thereof. Thus, when the string-like defect 234 occurs, it is more likely to project to the outside of BM (the outside of a region connecting the shortest distance between nearest adjacent spacers) in Comparative Example 1 than in Embodiment 1. In addition, the string-like defect 234 is considered to be more stable when it is located along the alignment direction of liquid crystal, and thus, the string-like defect 234 in Comparative Example 1 tends to form a curvature and project to the outside of BM. These are considered to be the reasons why more string-like defects were observed in Comparative Example 1.

Hereinafter, a monomer that can be suitably used in the present embodiment is described in detail. The monomer used for the formation of the polymer layer of the present invention can be confirmed by confirming the molecular structure of the monomer unit in the polymer layer of the present invention.

The polymer layer is preferably a polymerized product of a monomer polymerizable by light irradiation. In particular, the polymer layer is preferably formed by polymerization of a monomer polymerizable by ultraviolet irradiation.

The polymer layer is also preferably formed by polymerization of a monomer including a monofunctional or polyfunctional polymerizable group including at least one kind of ring structure. Examples of the monomer include compounds represented by the following chemical formula (1):

[Chem. 1]

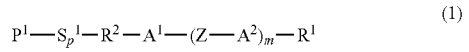
(1)

In the formula, $R_1$ represents a —$R^2$—$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a C1 to C12 linear or branched alkyl group. $P^1$ represents a polymerizable group. $Sp^1$ represents a C1 to C6 linear, branched, or cyclic alkylene group or alkyleneoxy group, or a direct bond. A hydrogen atom in $R^1$ may be substituted with a fluorine atom or a chlorine atom. A —$CH_2$— group in $R^1$ may be substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, as long as an oxygen atom and a sulfur atom are not adjacent to each other. $R^2$ represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond. $A^1$ and $A^2$ are the same or different, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group. —$CH_2$— groups in $A^1$ and $A^2$ each may be substituted with an —O— group or an —S— group, as long as they are not adjacent to each other. Hydrogen atoms in $A^1$ and $A^2$ each may be substituted with a fluorine atom, a chlorine atom, a —CN group, or a C1 to C6 alkyl, alkoxy, alkyl carbonyl, alkoxy carbonyl, or alkyl carbonyloxy group. Each Z are the same or different, and represents an —O— group, an —S— group, an —NH— group, a —CO— group, a —COO— group, an —O— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO group, an —OCO—CH=CH— group, or a direct bond; and m is 0, 1, or 2.

More specific examples thereof include any of compounds represented by the following chemical formulae (2-1) to (2-5):

[Chem. 2]

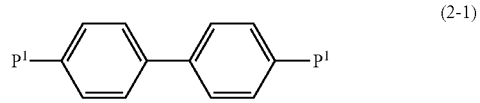
(2-1)

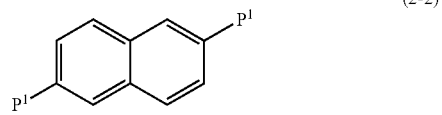
(2-2)

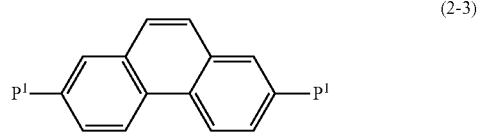
(2-3)

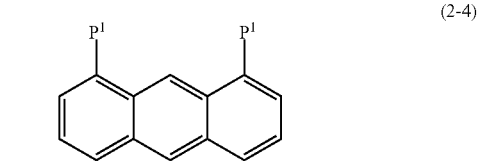
(2-4)

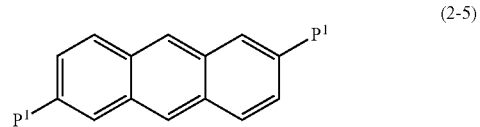
(2-5)

In each formula, each $P^1$ are the same or different, and each represents a polymerizable group.

Examples of $P^1$ above include an acryloyloxy group, a methacryloyloxy group, a vinyl group, a vinyloxy group, an acryloylamino group, and a methacryloylamino group. Herein, hydrogen atoms in benzene rings and fused rings in the compounds represented by the above chemical formulae (2-1) to (2-5) may be partially or fully substituted with halogen atoms, or C1 to C12 alkyl or alkoxy groups. In addition, hydrogen atoms in alkyl and alkoxy groups may be partially or fully substituted with halogen atoms. Further, the bonding positions of $P^1$ to the benzene rings and the fused rings are not limited to the ones shown.

The polymer layer of the present embodiment may be a polymerized product of a monomer polymerizable by visible light irradiation.

Monomers for forming the polymer layer include two or more types of monomers. The monomer polymerizable by visible light irradiation may be a monomer that polymerizes another monomer. The monomer that polymerizes another monomer refers to, for example, a monomer that undergoes a chemical reaction upon visible light irradiation; initiates and promotes polymerization of another monomer that does not polymerize by itself by visible light irradiation; and polymerizes itself, while the wavelength range that induces reaction is different depending on the molecular structure. Owing to the monomer that polymerizes another monomer, a large number of existing monomers that do not polymerize by light irradiation (such as visible light) can be used as materials of the polymer layer. Examples of the monomer that polymerizes another monomer include a monomer including a structure that generates a radical by visible light irradiation.

Examples of the monomer that polymerizes another monomer include compounds represented by the following chemical formula (3):

[Chem. 3]

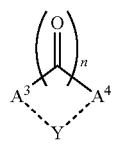

(3)

In the formula, $A^3$ and $A^4$ are the same or different, and each represents a benzene ring, a biphenyl ring, or a C1 to C12 linear or branched alkyl or alkenyl group. At least one of $A^3$ and $A^4$ includes an —$Sp^2$-$P^2$ group. A hydrogen atom in $A^3$ and $A^4$ each may be substituted with an —$Sp^2$-$P^2$ group, a halogen atom, a —CN group, an —$NO_2$ group, an —NCO group, an —NCS group, an —OCN group, an —SCN group, an —$SF_5$ group, or a C1 to C12 linear or branched alkyl, alkenyl, or aralkyl group. Two adjacent hydrogen atoms in $A^3$ and $A^4$ each may be substituted with a C1 to C12 linear or branched alkylene or alkenylene group to form a cyclic structure. A hydrogen atom in an alkyl, alkenyl, alkylene, alkenylene, or aralkyl group in $A^3$ and $A^4$ each may be substituted with an —$Sp^2$-$P^2$ group. A —$CH_2$— group in an alkyl, alkenyl, alkylene, alkenylene, or aralkyl group in $A^3$ and $A^4$ each may be substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, as long as an oxygen atom, a sulfur atom, and a nitrogen atom are not adjacent to one another. $P^2$ represents a polymerizable group. $Sp^2$ represents a C1 to C6 linear, branched, or cyclic alkylene or alkyleneoxy group, or a direct bond; and n is 1 or 2. A dotted line connecting $A^3$ with Y and a dotted line connecting $A^4$ with Y indicate that a Y-mediated bond may be present between $A^3$ and $A^4$. Y represents a —$CH_2$— group, a —$CH_2CH_2$— group, a —CH=CH— group, an —O— group, an —S— group, an —NH— group, an —$N(CH_3)$— group, an —$N(C_2H_5)$— group, an —$N(C_3H_7)$— group, an —$N(C_4H_9)$— group, an —$OCH_2$— group, a —$CH_2O$— group, an —$SCH_2$— group, or a —$CH_2S$— group, or a direct bond.

More specific examples thereof include any of compounds represented by the following chemical formulae (4-1) to (4-8):

[Chem. 4]

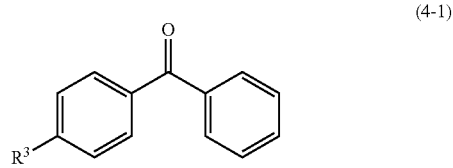

(4-1)

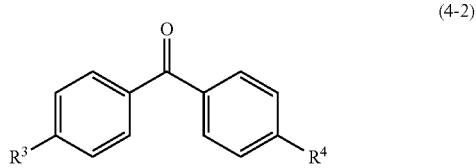

(4-2)

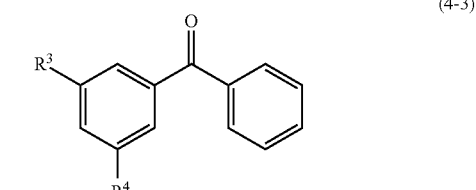

(4-3)

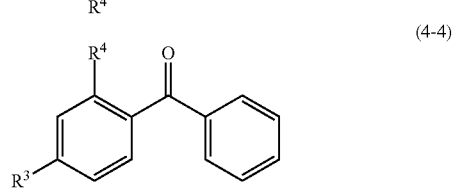

(4-4)

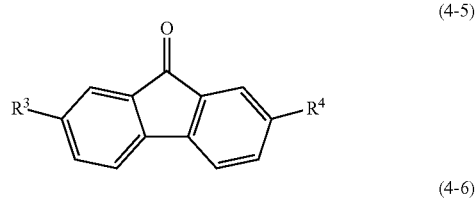

(4-5)

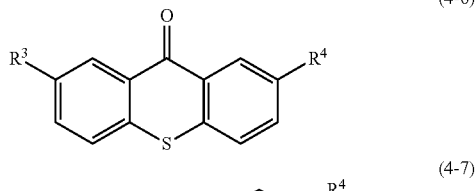

(4-6)

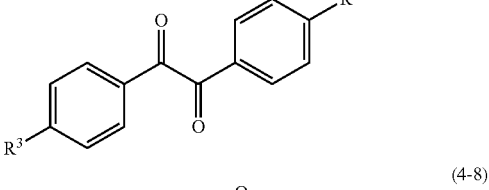

(4-7)

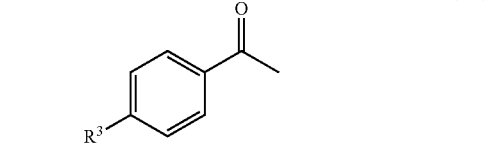

(4-8)

In the formula, $R^3$ and $R^4$ are the same or different, and each represents an —$Sp^2$-$P^2$ group, a hydrogen atom, a halogen atom, a —CN group, an —$NO_2$ group, an —NCO group, an —NCS group, an —OCN group, an —SCN group, an —$SF_5$ group, or a C1 to C12 linear or branched alkyl, aralkyl, or phenyl group. At least one of $R^3$ and $R^4$ includes an —$Sp^2$-$P^2$ group. $P^2$ represents a polymerizable group. $Sp^2$ represents a C1 to C6 linear, branched, or cyclic alkylene or alkyleneoxy group, or a direct bond. When at least one of $R^3$ and $R^4$ represents a C1 to C12 linear or branched alkyl, aralkyl, or phenyl group, a hydrogen atom in at least one of $R^3$ and $R^4$ above may be substituted with a fluorine atom, a chlorine atom, or an —$Sp^2$-$P^2$ group. A —$CH_2$— group in $R^3$ and $R^4$ each may be substituted with an —O— group, an —S— group, an —NH— group, a —CO— group, a —COO— group, an —O— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, as long as an oxygen atom, a sulfur atom, and a nitrogen atom are not adjacent to one another.

Examples of $P^2$ above include an acryloyloxy group, a methacryloyloxy group, a vinyl group, a vinyloxy group, an acryloylamino group, and a methacryloylamino group. Herein, hydrogen atoms in benzene rings in the compounds represented by the above chemical formulae (4-1) to (4-8) may be partially or fully substituted with halogen atoms or C1 to C12 alkyl or alkoxy groups. In addition, hydrogen atoms in alkyl and alkoxy groups may be partially or fully substituted with halogen atoms. Further, the bonding positions of $R^3$ and $R^4$ to the benzene rings are not limited to the ones shown.

The monomers for forming the polymer layer (for example, the compounds represented by the above chemical formulae (2-1) to (2-5), and the compounds represented by the above chemical formulae (4-1) to (4-8)) preferably include two or more polymerizable groups. For example, monomers including two polymerizable groups are preferred.

In the present invention, the above-described monomers may be added to liquid crystal without using a conventional polymerization initiator. This results in a significant improvement in electric properties because there is no residual polymerization initiator that can be an impurity in the liquid crystal layer. In other words, a polymerization initiator for the monomers can be substantially absent in the liquid crystal layer when the monomers are polymerized.

In the present embodiment, for example, a biphenyl-based bifunctional methacrylate monomer represented by the following chemical formula (5) may be used.

[Chem. 5]

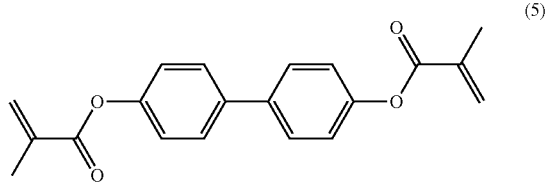

(5)

In this case, the formation of a polymer can be ensured without mixing a photopolymerization initiator. The radical generation process represented by the following formulae (6-1) and (6-2) is considered to be induced by light irradiation.

[Chem. 6]

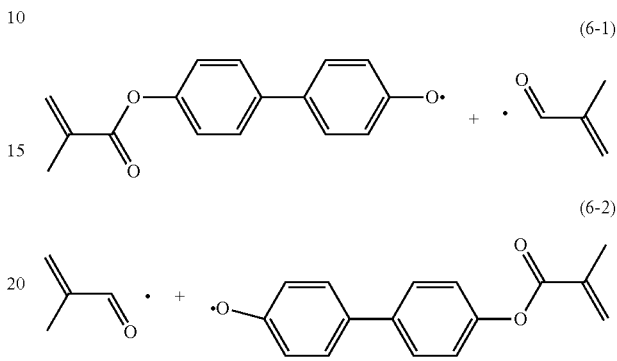

In addition, the present of a methacrylate group helps the monomer to form a polymer by radical polymerization.

Monomers that dissolve in liquid crystal are preferred as the monomers. Rod-like molecules are preferred as the monomers. Examples thereof may include naphthalene-based, phenanthrene-based, and anthracene-based monomers, in addition to the biphenyl-based monomer. In addition, hydrogen atoms therein may be partially or fully substituted with halogen atoms, alkyl groups, or alkoxy groups (hydrogen atoms in these groups may be partially or fully substituted with halogen atoms).

Examples of polymerizable groups may also include an acryloyloxy group, a vinyloxy group, an acryloylamino group, and a methacryloylamino group, in addition to the methacryloyloxy group. These monomers can generate radicals by light having a wavelength ranging from about 300 to 380 nm.

In addition to the above monomers, monomers such as acrylate and diacrylate having no photopolymerization initiating function may be mixed. The photopolymerization reaction rate can be adjusted with these monomers.

In addition, in the present embodiment, a mixture of a monomer represented by the following chemical formula (7A) and a monomer represented by the following chemical formula (7B) can also be used.

[Chem. 7]

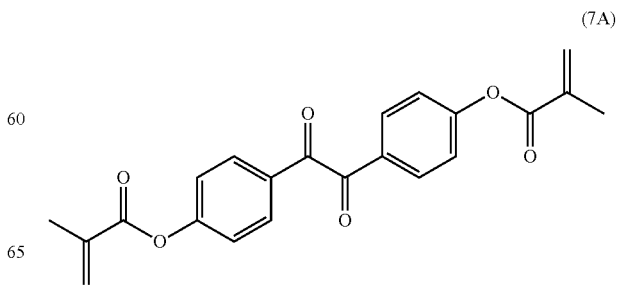

(7A)

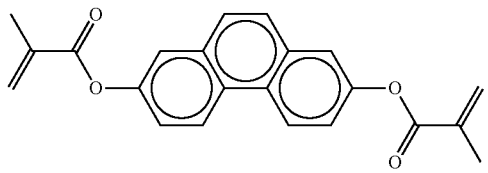

(7B)

In this case, the PS process may be performed with visible light irradiation. This reduces damage to the liquid crystal and the photo-alignment film. Other examples of monomers that can be used include benzoin ether-based, acetophenone-based, benzil ketal-based, and ketone-based monomers, which generate radicals by photofragmentation and hydrogen abstraction. A polymerizable group must be attached to these monomers. Examples of the polymerizable group include an acryloyloxy group, a vinyloxy group, an acryloylamino group, and a methacryloylamino group, in addition to the methacryloyloxy group.

In addition, in the present embodiment, a polyimide including a cyclobutane skeleton may be used as the main chain of a polymer of an alignment film material.

Next, a preferred embodiment of the liquid crystal layer in the liquid crystal display device of the present embodiment will be described. The liquid crystal layer preferably contains liquid crystal molecules including, in a molecular structure thereof, a multiple bond other than conjugated double bonds of a benzene ring. The liquid crystal molecules may have either positive anisotropy of dielectric constant (positive type) or negative anisotropy of dielectric constant (negative type). The liquid crystal molecules are preferably nematic liquid crystal molecules having a high symmetric property in the liquid crystal layer.

The multiple bond does not include conjugated double bonds of a benzene ring because the benzene ring has low reactivity. However, as long as the liquid crystal molecule includes, as an essential bond, a multiple bond other than conjugated double bonds of a benzene ring, the liquid crystal molecules of the present embodiment may include conjugated double bonds of a benzene ring: the conjugated double bonds does not have to be particularly excluded. In addition, in the present embodiment, the liquid crystal molecules contained in the liquid crystal layer may be a mixture of plural kinds thereof. A liquid crystal material may be a mixture of plural kinds of liquid crystal molecules in order to secure the reliability, to improve the response speed, and to adjust the liquid crystal phase temperature range, elastic constant, anisotropy of dielectric constant, and refractive index anisotropy.

The multiple bond is preferably a double bond, and it is more preferred that the double bond be present in an ester group or an alkenyl group. For example, it is preferred that the double bond is present in an alkenyl group. The double bond has a higher reactivity than a triple bond. The multiple bond may be a triple bond, and in that case, the triple bond is preferably present in a cyano group. Further, each liquid crystal molecule preferably includes two or more kinds of multiple bonds.

Each liquid crystal molecule preferably contains at least one molecular structure selected from the group consisting of structures represented by the following formulae (8-1) to (8-6). Among these, a molecular structure represented by the following formula (8-4) is particularly preferred.

[Chem. 8]

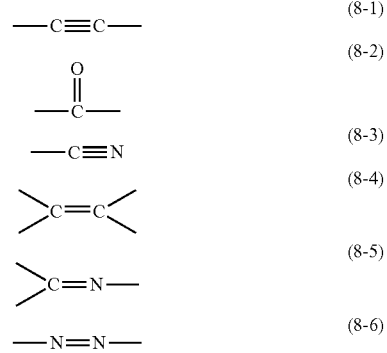

Figure 12:
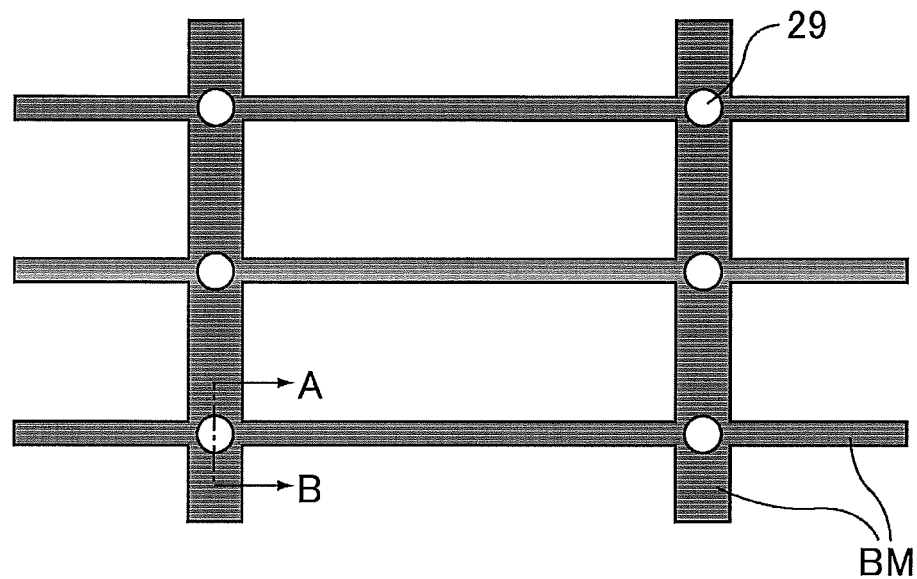
FIG. 12 is a planar schematic diagram showing a grid-like black matrix and photospacers in the present embodiment.
Figure 13:
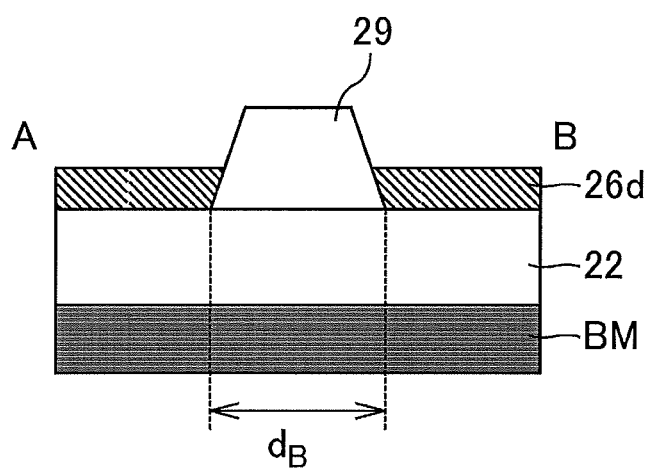
FIG. 13 is a cross-sectional schematic diagram of FIG. 12.

Lastly, the bottom diameter (diameter as measured on the bottom (base)) of the PS as defined herein is described. FIG. 12 is a planar schematic diagram showing a grid-like black matrix BM and photospacers 29 in the present embodiment. FIG. 13 is a cross-sectional schematic diagram of FIG. 12. A flattening film 22 and the like are disposed on the black matrix BM; and an alignment film 26d made from polyimide or the like is disposed on the flattening film 22 and the like. The bottom diameter of the PS is the diameter of its surface on the alignment film 226d, which is opposite to the liquid crystal layer. It is expressed as "$d_B$".

Embodiment 5

In Embodiment 5, a cell was completed in the same manner as in Embodiment 1, except for the below-described alignment film material and alignment treatment conditions.

A polyimide solution including a cyclobutane skeleton was used as an alignment film material. The alignment film material was applied to the substrates and dried in the same manner as in Embodiment 1.

The surface of each substrate was irradiated with polarized ultraviolet light having a wavelength of 254 nm with an intensity of 500 mJ/cm$^2$ from the normal direction of each substrate for alignment treatment. As a result, the alignment film material applied to the substrates caused photodissociation, and horizontal alignment films were thus formed.

This liquid crystal panel was observed for the presence of string-like defects under a microscope. Only one string-like defect was present.

Embodiment 6

Embodiment 6 is the same as Embodiment 1, except that the diameter of the bottom (base) of each photospacer formed on the CF substrate was changed to 9 μm. This liquid crystal panel was observed for the presence of string-like defects under a microscope. Only about two string-like defects were observed.

Each of the embodiments described above may be suitably combined without departing from the scope of the present invention.

The present application claims priority to Patent Application No. 2011-185045 filed in Japan on Aug. 26, 2011 under the Paris Convention and provisions of national law in a designated State, the entire contents of which are hereby incorporated by reference.

REFERENCE SIGNS LIST 10, 110: TFT substrate (array substrate)
12: slit electrode 13: insulation layer
14: lower layer electrode
15, 25, 115, 125: glass substrate
16, 26, 116, 126: alignment film (horizontal photo-alignment film)
17, 27, 117, 127: PS layer (polymer layer)
18, 28, 118, 128: linear polarizing plate
20, 120: counter substrate (CF substrate)
29, 29a, 29b, 29c, 29d, 29e, 29f, 129, 229a, 229b, 229c, 229d, 229e, 229f: spacer
30, 130: liquid crystal layer
32, 32p, 132, 232: liquid crystal alignment direction
34, 234: string-like defect
111: signal electrode
112: common electrode
113: a pair of combteeth electrodes
R: red pixel
G: green pixel
B: blue pixel

The invention claimed is:

1. A liquid crystal display panel comprising:
a pair of substrates; and
a liquid crystal layer interposed between the pair of substrates,
wherein at least one of the pair of substrates includes an alignment film and an electrode in the stated order from the liquid crystal layer side,
the alignment film aligns liquid crystal molecules horizontally to a main surface of the at least one of the pair of substrates,
the liquid crystal display panel includes multiple spacers between the pair of substrates, the spacers being arranged such that an inter-spacer distance between adjacent spacers in a longitudinal direction is different from an inter-spacer distance between adjacent spacers in a transverse direction in a plan view of the main surface of the pair of substrates,
an angle defined between a line connecting the spacers with a shorter inter-spacer distance than the other inter-spacer distance and an alignment direction of the liquid crystal molecules at a voltage lower than a threshold voltage in the liquid crystal layer is 20° or smaller as seen in a plan view of the main surface of the at least one of the pair of substrates, and
each pixel includes areas in which the liquid crystal molecules have different alignment directions during either or both voltage application and non-voltage application.

2. The liquid crystal display panel according to claim 1, wherein one of the pair of substrates includes a black matrix, and
the spacers are arranged so as to be superimposed with the black matrix.

3. The liquid crystal display panel according to claim 2, wherein the spacers are arranged in a grid pattern.

4. The liquid crystal display panel according to claim 1, wherein the electrode is provided with an opening.

5. The liquid crystal display panel according to claim 4, wherein the electrode is a combtooth electrode or a slit electrode.

6. The liquid crystal display panel according to claim 1, wherein the line connecting the spacers with a shorter inter-spacer distance is parallel to the alignment direction of the liquid crystal molecules at a voltage lower than a threshold voltage in the liquid crystal layer.

7. The liquid crystal display panel according to claim 1, wherein the alignment film includes a photoactive material.

8. The liquid crystal display panel according to claim 7, wherein the photoactive material includes a cyclobutane skeleton in a repeating unit.

9. The liquid crystal display panel according to claim 1, wherein the liquid crystal layer contains the liquid crystal molecules including, in a molecular structure thereof, a multiple bond other than conjugated double bonds of a benzene ring.

10. The liquid crystal display panel according to claim 9, wherein the multiple bond is a double bond.

11. A liquid crystal display panel comprising:
a pair of substrates;
a liquid crystal layer interposed between the pair of substrates; and
polymer layers formed between the pair of substrates and the liquid crystal layer,
wherein at least one of the pair of substrates includes an alignment film and an electrode in the stated order from the liquid crystal layer side,
the alignment film aligns liquid crystal molecules horizontally to a main surface of the at least one of the pair of substrates,
the liquid crystal display panel includes multiple spacers between the pair of substrates, the spacers being arranged such that an inter-spacer distance between adjacent spacers in a longitudinal direction is different from an inter-spacer distance between adjacent spacers in a transverse direction in a plan view of the main surface of the pair of substrates, and
an angle defined between a line connecting the spacers with a shorter inter-spacer distance than the other inter-spacer distance and an alignment direction of the liquid crystal molecules at a voltage lower than a threshold voltage in the liquid crystal layer is 20° or smaller as seen in a plan view of the main surface of the at least one of the pair of substrates.

12. The liquid crystal display panel according to claim 11, wherein one of the pair of substrates includes a black matrix, and
the spacers are arranged so as to be superimposed with the black matrix.

13. The liquid crystal display panel according to claim 12, wherein the spacers are arranged in a grid pattern.

14. The liquid crystal display panel according to claim 11, wherein the polymer layers are polymerized products of a monomer contained in the liquid crystal layer, and
the monomer includes at least one compound represented by the following chemical formula (1):

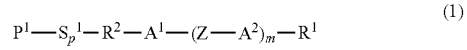

$$P^1-S_p^1-R^2-A^1-(Z-A^2)_m-R^1 \qquad (1)$$

wherein $R^1$ represents a $-R^2-Sp^1-P^1$ group, a hydrogen atom, a halogen atom, a $-CN$ group, an $-NO_2$ group, an $-NCO$ group, an $-NCS$ group, an $-OCN$ group, an $-SCN$ group, an $-SF_5$ group, or a C1 to C12 linear or branched alkyl group; $P^1$ represents a polymerizable group; $Sp^1$ represents a C1 to C6 linear, branched, or cyclic alkylene group or alkyleneoxy group, or a direct bond; a hydrogen atom in $R^1$ may be substituted with a fluorine atom or a chlorine atom; a $-CH_2-$ group in $R^1$ may be substituted with an $-O-$ group, an $-S-$ group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or an —OCO—CH=CH— group, as long as an oxygen atom and a sulfur atom are not adjacent to each other; R$^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond; A$^1$ and A$^2$ are the same or different, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group; —CH$_2$— groups in A$^1$ and A$^2$ each may be substituted with an —O— group or an —S— group, as long as they are not adjacent to each other; hydrogen atoms in A$^1$ and A$^2$ each may be substituted with a fluorine atom, a chlorine atom, a —CN group, or a C1 to C6 alkyl, alkoxy, alkyl carbonyl, alkoxy carbonyl, or alkyl carbonyloxy group; each Z is the same or different, and represents an —O— group, an —S— group, an —NH— group, a —CO— group, a —COO— group, an —COO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO group, an —OCO—CH=CH— group, or a direct bond; and m is 0, 1, or 2.

15. The liquid crystal display panel according to claim 14, wherein the monomer include at least one compound represented by the following chemical formulae (2-1) to (2-5):

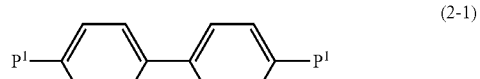
(2-1)

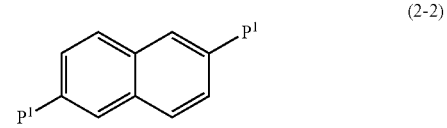
(2-2)

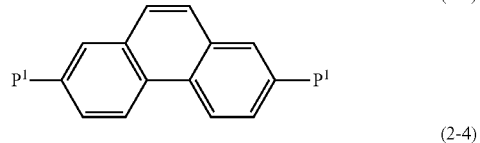
(2-3)

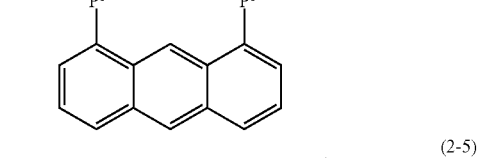
(2-4)

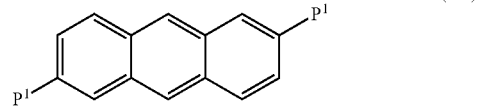
(2-5)

wherein each P$^1$ is the same or different, and represents a polymerizable group.

16. The liquid crystal display panel according to claim 15, wherein, in each formula, each P$^1$ is the same or different, and represents an acryloyloxy group, a methacryloyloxy group, a vinyl group, a vinyloxy group, an acryloylamino group, or a methacryloylamino group.

17. The liquid crystal display panel according to claim 11, wherein the line connecting the spacers with a shorter inter-spacer distance is parallel to the alignment direction of the liquid crystal molecules at a voltage lower than a threshold voltage in the liquid crystal layer.

18. The liquid crystal display panel according to claim 11, wherein the alignment film includes a photoactive material.

19. The liquid crystal display panel according to claim 18, wherein the photoactive material includes a cyclobutane skeleton in a repeating unit.

20. The liquid crystal display panel according to claim 11, wherein the liquid crystal layer contains the liquid crystal molecules including, in a molecular structure thereof, a multiple bond other than conjugated double bonds of a benzene ring.

* * * * *